(12) United States Patent
Ishihara

(10) Patent No.: US 6,775,042 B2
(45) Date of Patent: Aug. 10, 2004

(54) LIGHT SCANNER, MULTIBEAM SCANNER, AND IMAGE FORMING APPARATUS USING THE SAME

(75) Inventor: Keiichiro Ishihara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/178,360

(22) Filed: Jun. 25, 2002

(65) Prior Publication Data

US 2003/0063360 A1 Apr. 3, 2003

(30) Foreign Application Priority Data

Jun. 27, 2001 (JP) ........................................ 2001/194395

(51) Int. Cl.[7] .............................................. G02B 26/08
(52) U.S. Cl. ...................................... 359/212; 359/204
(58) Field of Search ................................ 359/204, 212, 359/216, 227, 230, 232, 233, 234; 250/232, 233; 349/233, 241, 243, 260

(56) References Cited

U.S. PATENT DOCUMENTS 5,463,418 A    10/1995  Tateoka ........................ 347/244
5,570,224 A *  10/1996  Endo et al. .................... 359/212
5,774,248 A *  6/1998   Komatsu ....................... 359/204
6,317,244 B1 * 11/2001  Ishibe .......................... 359/204

FOREIGN PATENT DOCUMENTS

JP           5-34613         2/1993

* cited by examiner

*Primary Examiner*—Euncha Cherry
(74) *Attorney, Agent, or Firm*—Fitzpatrick, Cella, Harper & Scinto

(57) ABSTRACT

A multibeam scanner including a light source for emitting a plurality of light beams, a deflector for deflecting the plurality of light beams emitted from the light source, and a scanning optical system for guiding the plurality of light beams deflected by the deflector to a scan surface. A first light shielding member for determining one end of the diameter of at least one of the plurality of light beams and a second light-shielding member for determining the other end of the diameter of the at least one of the plurality of light beams are disposed apart from each other in a direction in which the light beams propagate and between the light source and the deflector. The first light-shielding member and the second light-shielding member are used to limit the diameter of the at least one of the plurality of light beams.

21 Claims, 15 Drawing Sheets

LIGHT SCANNER, MULTIBEAM SCANNER, AND IMAGE FORMING APPARATUS USING THE SAME

BACKGROUND OF THE INVENTION

1. Field of the Invention

The present invention relates to a light scanner, a multibeam scanner, and an image forming apparatus using the same. More particularly, the present invention relates to an image forming apparatus which is suitable for use as a laser beam printer or a digital copying machine, making use of an electrophotographic process or the like, and which is used to record image information by deflecting (reflecting) light which has been emitted from a light source using a polygon mirror, serving as deflecting means, and by scanning a scan surface with the light through scanning optical means (that is, an image-forming scanning optical system). Even more particularly, the present invention relates to a multibeam scanner which achieves higher speed and higher definition by performing optical scanning operations using a plurality of light beams at the same time, and which provides a good image by reducing jitters and pitch errors.

2. Description of the Related Art

FIG. 18 is a sectional view (main scanning sectional view) of the main portion of a related multibeam scanning optical system in a main scanning direction thereof.

In FIG. 18, reference numeral 91 denotes light source means, which is, for example, a semiconductor laser array including two light-emitting points (light sources). The two light-emitting points are disposed apart from each other in the main scanning direction and a subscanning direction. Reference numeral 92 denotes a condenser lens system which includes one collimator lens and which converts two light beams that have been emitted by the light source means 91 into substantially parallel light beams or convergent light beams. Reference numeral 93 denotes a cylindrical lens which has a predetermined refractive power only in the subscanning direction. Reference numeral 94 denotes an aperture diaphragm which shapes the two light beams that have passed through the cylindrical lens 93 so that they have desired optimal shapes. Reference numeral 95 denotes deflecting means (light deflector), which is, for example, a rotating polygon mirror, and which rotates at a constant speed in the direction of arrow A by driving means 98 such as a motor. Reference numeral 96 denotes a scanning lens system (image-forming scanning optical system), serving as scanning optical means, having an fθ characteristic. The scanning lens system 96 includes two fθ lenses, a first fθ lens 96a and a second fθ lens 96b. The scanning lens system 96 has a tilt correcting function as a result of putting a location near a deflecting surface 95a of the light deflector 95 and a location near a photosensitive drum surface 97, serving as a scan surface, in a conjugate relationship within a subscanning cross-sectional plane.

In FIG. 18, the two light beams that have been emitted by the light source means 91 after being modulated in accordance with image information are converted into substantially parallel light beams or convergent light beams by the condenser lens system 92, and the converted light beams are incident upon the cylindrical lens 93. Of the light beams portions incident upon the cylindrical lens 93, those within a main scanning cross-sectional plane exit from the cylindrical lens 93 unchanged, while those within the subscanning cross-sectional plane are focused in order to form a substantially linear image (a longitudinal linear image in the main scanning direction) on the deflecting surface 95a of the light deflector 95 through the aperture diaphragm 94. Here, by the aperture diaphragm 94, the cross-sectional sizes of the light beams are limited. The trio light beams that have been deflected (reflected) at the deflecting surface 95a of the light deflector 95 are focused in the form of a spot on the photosensitive drum surface 97 bat the scanning lens system 96. By rotating the light deflector 95 in the direction of arrow A, the photosensitive drum surface 97 is optically scanned at a constant velocity in the direction of arrow B (main scanning direction). By this, two scanning lines are formed on the photosensitive drum surface 97, which is a recording medium, in order to record an image.

In order to record image information with high precision using this type of multibeam scanner, it is important to properly correct jitters (displacements in printing positions) and non-uniform pitches over the entire scan surface by properly focusing a plurality of light beams on the entire scan surface.

In general, when forming an image by scanning the photosensitive drum surface with light beams that have been emitted by the light source, in order to obtain a good image with high resolution, it is necessary to reduce the diameter of a light beam spot on the photosensitive drum surface and to reduce the pitch in the subscanning direction.

In order to reduce the pitch in the subscanning direction in the multibeam scanner, light source means (or a semiconductor laser array) disposed by being tilted obliquely from the main scanning direction is often used.

FIG. 19 is a sectional view (main scanning sectional view) of another related multibeam scanner of this type in a main scanning direction thereof. In FIG. 19, component parts corresponding to those shown in FIG. 18 are given the same reference numerals.

In FIG. 19, since a plurality of light-emitting points 91a and 91b of light source means 91 are disposed apart from each other by a certain distance in the main scanning direction, light beams that have exited from a condenser lens system 92 are not parallel to each other, so that they are at a certain angle from each other. Each light beam that has exited from the condenser lens system 92 is incident upon a polygon mirror 95, which is a light deflector, through a cylindrical lens 93.

At this time, the light beams cross each other at the location of an aperture diaphragm 94 disposed between the condenser lens system 92 and the polygon mirror 95, so that, by the angle of each light beam and by a distance L from a reference position of a deflecting surface 95a of the polygon mirror 95 to the aperture diaphragm 94, the interval between the light beams on the deflecting surface 95a of the polygon mirror 95 is determined (restricted). By reducing the interval between the light beams on the deflecting surface 95a of the polygon mirror 95, the light beams are properly focused on a photosensitive drum surface 97.

A multibeam scanner which satisfies such optical characteristics is disclosed in, for example, Japanese Patent Laid-Open No. 5-34613. According to this document, in the structure of the multibeam scanner, a plurality of light beams are converted into substantially parallel light beams at a condenser lens system, and the substantially parallel light beams are caused to impinge upon a polygon mirror through an aperture diaphragm. Then, by a scanning lens system, the substantially parallel light beams are led onto a scan surface. When scanning the scan surface with the plurality of light beams at the same time, the relationship among the number of light-emitting points of the light source means, the pitch in a main scanning direction, the distance from the polygon mirror to the aperture diaphragm, and the focal length of the condenser lens system is specified in order to properly focus the plurality of light beams on the scan surface.

When a multibeam scanner is used, it is necessary to properly correct jitters and pitch errors. Jitter refers to a relative displacement in positions for printing using a plurality of light beams in a main scanning direction. Pitch error refers to a deviation from a specified value (for example, 42.3 μm when printing resolution is 600 dpi) of the interval between scanning lines that are formed when a plurality of light beams are used at the same time for light scanning.

In order to reduce jitters, it is necessary to cause the light beams to reach the same location of the scanning lens system, or locations close to each other on the scanning lens system, when scanning the same location of the scan surface. This is achieved by reducing the interval between the light beams on the deflecting surface of the polygon mirror. Here, for example, a method for disposing an aperture diaphragm, serving as optimal means, near the deflecting surface of the polygon mirror is used.

However, more compact and wider-field-of-angle scanners in recent years have caused the scanning lens system and light beams deflected by the polygon mirror to be disposed near the deflecting surface of the polygon mirror, so that there is no space to dispose the aperture diaphragm. Therefore, there is a problem in that it is physically difficult to dispose the aperture diaphragm near the deflecting surface of the polygon mirror.

In general, pitch errors are corrected by causing the magnification of the scanning lens system in the subscanning direction to be constant. However, pitch errors sometimes occur by, for example, decentering of the cylindrical lens and the scanning lens system in the subscanning direction.

Here, in order to reduce how readily pitch errors are affected by decentering, it is necessary to cause the light beams to reach the same location of the scanning lens system or locations close to each other on the scanning lens system when scanning the same location of the scan surface. This can be achieved by reducing the interval between the light beams on the deflecting surface of the polygon mirror. Here, the method for disposing an aperture diaphragm, serving as optimal means, near the deflecting surface of the polygon mirror is used. (This method is the same as that used to reduce jitters.) However, the same problem as that mentioned above arises.

On the other hand, when jitters and pitch errors are reduced by disposing the aperture diaphragm near the deflecting surface of the polygon mirror, the polygon mirror becomes larger, and the scanning lens system is disposed away from the polygon mirror. Therefore, increased size of the entire scanner becomes a problem.

SUMMARY OF THE INVENTION

It is an object of the present invention to provide a light scanner and a multibeam scanner which can properly focus light on a scan surface, and which can decrease jitters and pitch errors. It is another object of the present invention to provide an image forming apparatus using the same.

It is still another object of the present invention to provide a light scanner and a multibeam scanner which are compact, which have simple structures, and which allow an aperture diaphragm and a synchronism-detecting diaphragm to be disposed at a greater number of locations. It is still another object of the present invention to provide an image forming apparatus using the same.

According to a first aspect of the present invention, there is provided a light scanner comprising a deflector for deflecting light emitted from a light source, a scanning optical system for guiding the light deflected by the deflector to a scan surface, a first light-shielding member for determining one end of a diameter of the light emitted from the light source, and a second light-shielding member for determining the other end of the diameter of the light emitted from the light source. The first light-shielding member and the second light-shielding member are used to limit the diameter of the light emitted from the light source and are disposed apart from each other in a direction in which the light propagates.

In one form of the first aspect, the first light-shielding member and the second light-shielding member are integrally formed.

In another form of the first aspect, the first light-shielding member and the second light-shielding member limit a diameter of the light within a main scanning cross sectional plane.

In still another form of the first aspect, the first light-shielding member and the second light-shielding member limit a diameter of the light within a subscanning cross sectional plane.

According to a second aspect of the present invention, there is provided an image forming apparatus comprising a light scanner according to any one of aforementioned claims, a photosensitive member disposed at the scan surface, a developing device for developing as a toner image an electrostatic latent image formed on said photosensitive member using the light with which said photosensitive member has been scanned by the light scanner, a transferring device for transferring the toner image formed by the developing device onto a transfer material, and a fixing device for fixing the transferred toner image to the transfer material.

According to a third aspect of the present invention, there is provided an image forming apparatus comprising a light scanner according to any one of the aforementioned claims, and a printer controller for converting code data input from an external device into an image signal, and inputting the image signal to the light scanner.

According to a fourth aspect of the present invention, there is provided a multi-beam scanner comprising a light source for emitting a plurality of light beams, a deflector for deflecting the plurality of light beams emitted from the light source, a scanning optical system for guiding the plurality of light beams that have been deflected by the deflector onto a scan surface, a first light shielding member for determining one end of a diameter of at least one of the plurality of light beams, and a second light-shielding member for determining the other end of the diameter of the at least one of the plurality of light beams. The first light-shielding member and the second light-shielding member are used to limit the diameter of the at least one of the plurality of light beams and are disposed apart from each other in a direction in which the light beams propagate.

In one form of the fourth aspect, the first light-shielding member and the second light-shielding member limit the light-beam diameter within a main scanning cross sectional plane.

In another form of the fourth aspect, the first light-shielding member and the second light-shielding member limit the light-beam diameter within a subscanning cross sectional plane.

In still another form of the fourth aspect, the first light-shielding member determines a scan-surface-side portion of the diameter of the at least one of the plurality of light beams and the second light-shielding member determines a portion at a side opposite to the scan-surface side of the diameter of the at least one of the plurality of light beams. The second light-shielding member is disposed closer to the deflector than the first light-shielding member.

In still another form of the fourth aspect, the multi-beam scanner further comprises a cylindrical lens disposed between the light source and the deflector having a refractive power only in a subscanning direction. The first light-shielding member and the second light-shielding member are disposed between the cylindrical lens and the deflector.

In still another form of the fourth aspect, of the first and second light-shielding members, the light-shielding member that is disposed at a light-source side determines subscanning-direction diameters of the plurality of light beams emitted from the light source.

In still another form of the fourth aspect, the first light-shielding member and the second light-shielding member are integrally formed.

In still another form of the fourth aspect, the first light-shielding member and the second light-shielding member are disposed in that order from a light-source side. When the distance from a reference position of a deflecting surface of the deflector to the first light-shielding member is L1 (mm), and when the distance from the reference position of the deflecting surface of the deflector to the second light-shielding member is L2 (mm), the following condition is satisfied:

$$L2 \leq 0.8 \times L1.$$

In still another form of the fourth aspect, the first light-shielding member and the second light-shielding member are disposed in that order from a light-source side. When the distance from a reference position of a deflecting surface of the deflector to the first light-shielding member is L1 (mm), and when the distance from the reference position of the deflecting surface of the deflector to the second light-shielding member is L2 (mm), the following conditions are satisfied:

$$L2 < L1$$

$$L2 \leq 20 \text{ (mm)}.$$

In still another form of the fourth aspect, the multibeam scanner further comprises a lens system disposed between the light source and the deflector. The first light-shielding member and the second light-shielding member are disposed between the light source and the lens system. The first light-shielding member and the second light-shielding member are disposed in that order from a light-source side. The light source includes a plurality of light-emitting points. When the number of the plurality of light-emitting points is n, the pitch in a main scanning direction is d (mm), the focal length of said lens system is fc (mm), the distance from a reference position of a deflecting surface of the deflector to the first light-shielding member is L1 (mm), and the distance from the A reference position of the deflecting surface of the deflector to the second light-shielding member is L2 (mm), the following condition is satisfied:

$$\frac{d}{2} \times (n-1) \times \frac{L1+L2}{2 \times fc} \leq 0.2 \text{ (mm)}.$$

In still another form of the fourth aspect, the multibeam scanner further comprises a lens system disposed between the light source and the deflector. The first light-shielding member and the second light-shielding member are disposed between the light source and the lens system. The first light-shielding member and the second light-shielding member are disposed in that order from a light-source side. The light source includes a plurality of light-emitting points. When the number of the plurality of light-emitting points is n, the pitch in a main scanning direction is d (mm), the focal length of the lens system is fc (mm), the distance from a reference position of a deflecting surface of the deflector to the first light-shielding member is L1 (mm), the distance from the reference position of the deflecting surface of the deflector to the second light-shielding member is L2 (mm), and the focal length of the scanning optical system within a main scanning cross sectional plane is fk (mm), the following condition is satisfied:

$$\frac{d}{2} \times (n-1) \times \frac{L1+L2}{2 \times fc \times fk} \leq 0.01.$$

In still another form of the fourth aspect, the following condition is satisfied:

$$\frac{d}{2} \times (n-1) \times \frac{L1+L2}{2 \times fc \times fk} \leq 0.002.$$

In still another form of the fourth aspect, the multibeam scanner further comprises a synchronism detector for detecting synchronism by receiving the plurality of light beams deflected by the deflector, and a synchronism detecting diaphragm for limiting diameters of the plurality of light beams incident upon said synchronism detector. The synchronism detecting diaphragm is disposed between the deflector and the synchronism detector.

The synchronism detecting diaphragm may limit only main-scanning-direction diameters of the plurality of light beams deflected by the deflecting means.

The synchronism detecting diaphragm may be integrally formed with either one of or both of the first light-shielding member and the second light-shielding member.

In still another form of the fourth aspect, the multibeam scanner further comprises a synchronism detector for detecting a synchronism signal of the plurality of light beams used to scan the scan surface as a result of being deflected by the deflector, a third light-shielding member for intercepting one end of a diameter of at least one of the plurality of light beams deflected by the deflector, and it fourth light-shielding member for intercepting the other end of the diameter of the at least one of the plurality of light beams deflected by the deflector. The third light-shielding member and said fourth light-shielding member are disposed apart from each other in the direction in which the light beams propagate and between the deflector and the synchronism detector.

At least one of the first light-shielding member and the second light-shielding member and at least one of the third light-shielding member and the fourth light-shielding member may be integrally formed.

According to a fifth aspect of the present invention, there is provided a multibeam scanner comprising a light source for emitting a plurality of light beams, a deflector for deflecting the plurality of light beams, a scanning optical system for guiding the plurality of light beams deflected by the deflector onto a scan surface, a synchronism detector, a first light-shielding member for intercepting one end of a diameter of at least one of the plurality of light beams deflected by the deflector, and a second light-shielding member for intercepting the other end of the diameter of the at least one of the plurality of light beams. The first light-shielding member and the second light-shielding member are disposed apart from each other in a direction in which the light beams propagate and between the deflector and the synchronism detector.

According to a sixth aspect of the present invention, there is provided an image forming apparatus comprising any one of the multibeam scanners of the fourth aspect and the forms of the fourth aspect, a photosensitive member disposed at the scan surface, a developing device for developing as a toner image an electrostatic latent image formed on the photosensitive member using the light beams with which the photosensitive member has been scanned by the multi-beam scanner, a transferring device for transferring the toner image formed by the developing device onto a transfer material, and a fixing device for fixing the transferred toner image to the transfer material.

According to a seventh aspect of the present invention, there is provided an image forming apparatus comprising any one of the multibeam scanners of the fourth aspect and the forms of the fourth aspect, and a printer controller for converting code data input from an external device into an image signal and inputting the image signal to the multibeam scanner.

Further objects, features and advantages of the present invention will become apparent from the following description of the preferred embodiments with reference to the attached drawings.

DESCRIPTION OF THE PREFERRED EMBODIMENTS

[First Embodiment]

Figure 1:
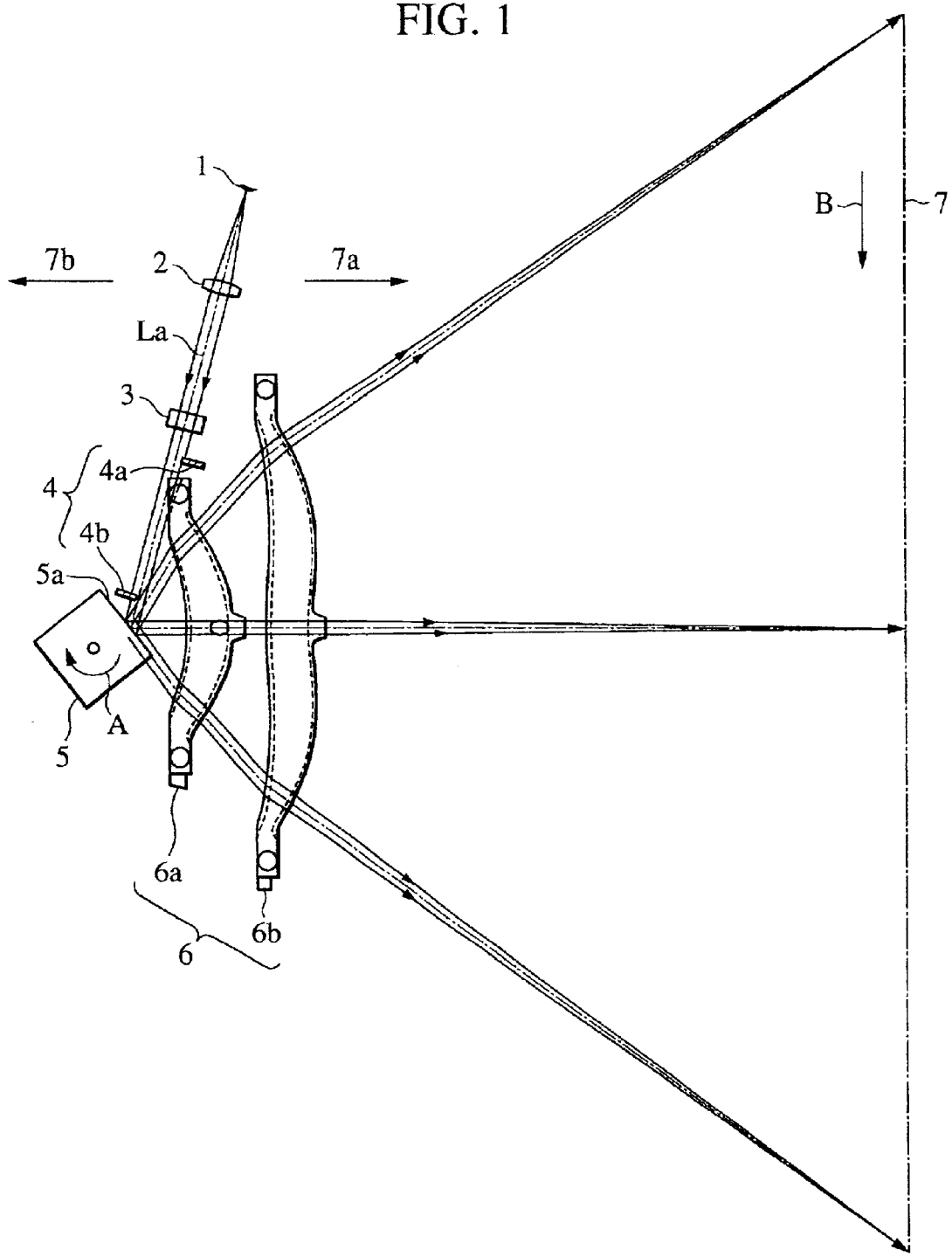
FIG. 1 is a sectional view of a multibeam scanner of a first embodiment of the present invention in a main scanning direction.

FIG. 1 is a sectional view (main scanning sectional view) of a multibeam scanner of a first embodiment of the present invention in a main scanning direction.

In the specification, the direction in which deflecting means deflects (reflects) light for performing a scanning operation is defined as the main scanning direction, while a direction which is perpendicular to the main scanning direction and the optical axis of scanning optical means is defined as the subscanning direction.

Referring to FIG. 1, reference numeral 1 denotes light source means, which is, for example, a semiconductor laser array including two light-emitting points. There may be three or more light-emitting points. The two light-emitting points are disposed apart from each other in the main scanning direction and the subscanning direction.

Reference numeral 2 denotes a condenser lens system which includes a collimator lens and which converts two divergent light beams that have been emitted by the light source means 1 into substantially parallel light beams.

Reference numeral 3 denotes a cylindrical lens which has a predetermined amount of refractive power only in the subscanning direction, and which focuses the two light beams that have passed through the collimator lens 2 at a location near a deflecting surface 5a of a light deflector 5 (described later) as a longitudinal linear image in the main scanning direction.

Reference numeral 4 denotes an aperture diaphragm (diaphragm member) including a first light-shielding member 4a and a second light-shielding member 4b. The first light-shielding member 4a restricts one end of the diameter of at least one of the two light beams that have passed through the cylindrical lens 3. The second light-shielding member 4b restricts the other end of the diameter of the at least one of the two light beams that have passed through the cylindrical lens 3. The first light-shielding member 4a and the second light-shielding member 4b are disposed apart from each other in a direction of propagation of the light beams between the cylindrical lens 3 and the light deflector 5. The diameters of the light beams that are incident upon the deflecting surface 5a of the light deflector 5 are restricted using the two light-shielding members 4a and 4b.

In the embodiment, the first light-shielding member 4a determines a scan-surface-side-7a portion of the diameter of the at least one light beam, whereas the second light-shielding member 4b determines a side-7b portion opposite to the scan-surface-side 7a of the diameter of the at least one light beam. The second light-shielding member 4b is disposed closer to the light deflector 5 than the first light-shielding member 4a. The first light-shielding member 4a and the second light-shielding member 4b are integrally formed using, for example, a sheet metal. However, the first light-shielding member 4a and the second light-shielding member 4b may be separately formed.

The first and second light-shielding members 4a and 4b can restrict the diameters of the light beams within a main scanning cross-sectional plane and/or a subscanning cross-sectional plane. In particular, the first light-shielding member 4a restricts the subscanning-direction diameters of the two light beams emitted from the light source means 1.

The collimator lens 2, the cylindrical lens 3, the aperture diaphragm 4, etc., are each a component part of light-incident optical means.

The light deflector 5, serving as deflecting means, is, for example, a rotating polygon mirror having four surfaces, and rotates with a constant speed in the direction of arrow A (shown in FIG. 1) by driving means (not shown) such as a motor.

The light beams from the light source means 1 may be directly guided to the light deflector 5 through the aperture diaphragm 4 without using the collimator lens 2, the cylindrical lens 3, etc.

Reference numeral 6 denotes a scanning lens system (image-forming scanning optical system), serving as scanning optical means, having a light-condensing function and an fθ characteristic. The scanning lens system 6 comprises two lenses, first and second optical elements (fθ lenses) 6a and 6b, having aspherical surfaces. The two light beams that have been deflected by the light deflector 5 are focused in the form of spots on a scan surface (photosensitive drum surface) 7 in order to form two scanning lines. By putting a location near the photosensitive drum surface 7 and a location near the deflecting surface 5a of the light deflector 5 in a conjugate relationship within the subscanning cross-sectional plane, the scanning lens system 6 is caused to provide a tilt correcting function.

Reference numeral 7 denotes the photosensitive drum surface, serving as a scan surface.

In the embodiment, the two light beams that have exited from the light source means 1 after being modulated in accordance with image information are converted into substantially parallel light beams by the collimator lens 2, and the substantially parallel light beams are incident upon the cylindrical lens 3. Of the light beam portions which have impinged upon the cylindrical lens 3, those within the main scanning cross-sectional plane exit therefrom unchanged. On the other hand, those within the subscanning cross-sectional plane are focused to form a substantially linear image (that is, a longitudinal linear image in the main scanning direction) at the deflecting surface 5a of the light deflector 5 through the aperture diaphragm 4. At this time, the sizes of the cross sections of the light beams are restricted by the aperture diaphragm 4. The light beams which have been deflected (reflected) at the deflecting surface 5a of the light deflector 5 are focused in the form of spots on the photosensitive drum surface 7 by the scanning lens system 6. By rotating the light deflector 5 in the direction of arrow A, the photosensitive drum surface 7 is optically scanned at a constant speed in the direction of arrow B (that is, the main scanning direction), whereby two scanning lines are formed on the photosensitive drum surface 7, serving as a recording medium, in order to perform an image recording operation.

In the embodiment, as mentioned above, the first and second light-shielding members 4a and 4b are both disposed in an optical path between the cylindrical lens 3 and the polygon mirror 5, so that the interval between the light beams in the main scanning direction on the deflecting surface 5a of the polygon mirror 5 is made small.

Figure 2:
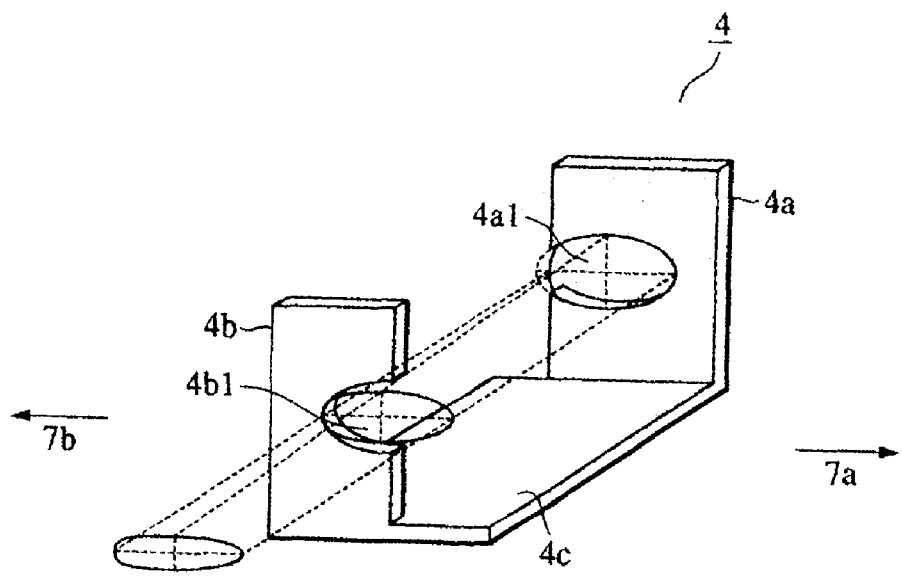
FIG. 2 is a schematic view of the main portion of an aperture diaphragm of the multibeam scanner of the first embodiment of the present invention.

FIG. 2 is a schematic view of the main portion of the aperture diaphragm 4 used in the first embodiment of the present invention. In FIG. 2, component parts corresponding to those shown in FIG. 1 are given the same reference numerals.

In FIG. 2, the first light-shielding member 4a is formed of a flat plate with an elliptical opening 4a1 being formed therein, and has a shape which is formed by cutting away a portion thereof disposed at the side 7b opposite to the scan surface 7 and which restricts scan-surface-side-7a ends of the two light beams that have exited from the semiconductor laser array 1 (not shown). The second light-shielding member 4b is similarly formed of a flat plate with an elliptical opening 4b1 having the same shape as the elliptical opening 4a1 being formed therein, and has a shape which is formed by cutting away a scan-surface-side-7a portion thereof and which restricts ends of the two light beams disposed at the side 7b opposite to the scan surface 7 that have exited from the semiconductor laser array 1. Here, the center of each of the elliptical openings 4a1 and 4b1 is disposed on the optical axis of the collimator lens 2. As shown in FIG. 2, the first light-shielding member 4a and the second light-shielding member 4b are integrally formed using one sheet plate 4c.

Figure 3:
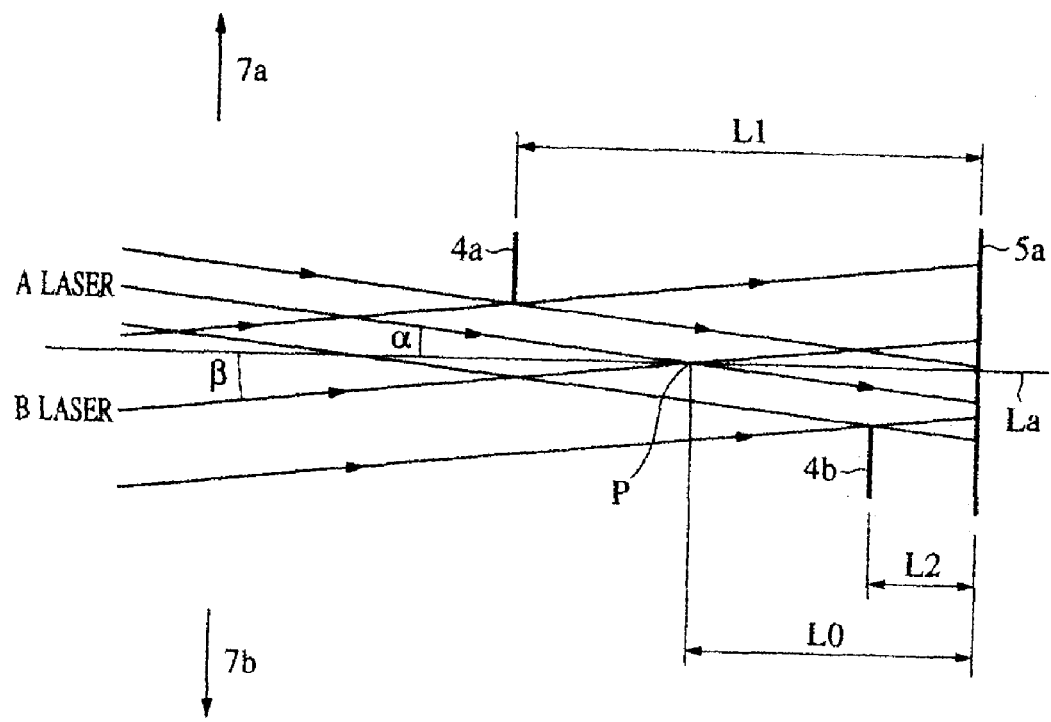
FIG. 3 illustrates optical action at the aperture diaphragm of the multibeam scanner of the first embodiment of the present invention.

With reference to FIG. 3, the structure and optical action of the aperture diaphragm 4 used in the embodiment will be described. Parts corresponding to those shown in FIGS. 1 and 2 are given the same reference numerals.

In FIG. 3, the two light beams that have exited from the semiconductor laser array 1 (not shown) are defined as A and B laser beams. FIG. 3 schematically illustrates a state in which, after the A and B laser beams have been converted into substantially parallel light beams by the collimator lens 2 (not shown), the substantially parallel light beams are incident upon the deflecting surface 5a of the polygon mirror 5 through the first and second light-shielding members 4a and 4b.

The first light-shielding member 4a restricts the scan-surface-side-7a ends of both the A and B laser beams, whereas the second light-shielding member 4b restricts the ends of the A and B laser beams disposed at the side 7b opposite to the scan surface 7. The centers of the light beam diameters (widths) that have been restricted by the first and second light-shielding members 4a and 4b are used to define principal rays. The positions of the principal rays are defined as the positions of the light beams.

Here, the A and B laser beams cross each other at a position P intermediate between the first light-shielding member 4a and the second light-shielding member 4b, so that, practically, the aperture diaphragm is disposed at this position. This means that a distance L0 from the deflecting surface 5a of the polygon mirror 5 to the practical aperture diaphragm is equal to the average of the sum of a distance L1 from the deflecting surface 5a to the first light-shielding member 4a and a distance L2 from the deflecting surface 5a to the second light-shielding member 4b as indicated in the following Condition (a):

$$L0 = \frac{L1 + L2}{2} \quad (a)$$

Since L2<L1 (Condition (b)) and L0<L1 (Condition (c)), it can be seen from the numerical conditions that, compared to the position of the aperture diaphragm disposed at the first light-shielding member 4a in a related structure, the practical position of the aperture diaphragm is situated closer to the deflecting surface 5a.

The amount of jitter and the amount of pitch error vary in proportion to the distance L0 from the deflecting surface 5a of the polygon mirror 5 to the practical position P of the aperture diaphragm 4. Therefore, by making use of the advantages of the present invention, a multibeam scanner with reduced jitter and pitch error can be provided.

Accordingly, in the related multibeam scanner, the light beams deflected at the deflecting surface 5a of the polygon mirror 5, the scanning lens system 6, etc., are disposed close to the deflecting surface 5a of the polygon mirror 5, so that, due to physical interference, there is no space to dispose the first light-shielding member 4a, disposed at the scan-surface side 7a, near the deflecting surface 5a of the polygon mirror 5, thereby making it impossible to dispose the aperture diaphragm 4 near the deflecting surface 5a of the polygon mirror 5. In contrast, if the structure of the embodiment is used, with the light-shielding member 4a, disposed at the scan-surface side 7a, being disposed at its present position, the second light-shielding member 4b, which is disposed at the side 7b opposite to the scan surface and which does not cause physical interference, is disposed close to the deflecting surface 5a of the polygon mirror 5 in order to make it possible to dispose the practical aperture diaphragm close to the deflecting surface 5a of the polygon mirror 5.

Therefore, it becomes possible to properly focus the two light beams that have passed through the aperture diaphragm 4 on the scan surface 7, and to decrease jitters and pitch errors.

Here, since angles α and β of the A and B laser beams from an optical axis La are different, the diameters of the light beams incident upon the deflecting surface 5a are different. However, since the angles α and β are very small, the amount of change in the diameters of the light beams is small, so that this is essentially not a problem.

In the embodiment, when the distance from a reference position of the deflecting surface 5a of the polygon mirror 5 to the first light-shielding member 4a is L1 (mm) and the distance from the reference position of the (deflecting surface 5a of the polygon mirror 5 to the second light-shielding member 4b is L2 (mm), the following Condition (1) is satisfied:

$$L2 \leq 0.8 \times L1 \tag{1}$$

Using the parameters L1 and L2, the following Condition (2) is satisfied:

$$\left. \begin{array}{l} L2 < L1 \\ L2 \leq 20 \text{ (mm)} \end{array} \right] \tag{2}$$

In the embodiment, when the number of the plurality of light-emitting points is n, the pitch in the main scanning direction is d (mm), and the focal length of the condenser lens system (collimator lens) 2 is fc (mm), and when the parameters L1 and L2 are used, the following Condition (3) is satisfied:

$$\frac{d}{2} \times (n-1) \times \frac{L1 + L2}{2 \times fc} \leq 0.2 \text{ (mm)} \tag{3}$$

In the embodiment, when the focal length of the scanning lens system 6 in the main scanning direction is fk (mm), and when the parameters L1, L2, n, d, and fc are used, the following Condition (4) is satisfied:

$$\frac{d}{2} \times (n-1) \times \frac{L1 + L2}{2 \times fc \times fk} \leq 0.01 \tag{4}$$

Desirably, the Condition (4) is transformed into Condition (5):

$$\frac{d}{2} \times (n-1) \times \frac{L1 + L2}{2 \times fc \times fk} \leq 0.002 \tag{5}$$

The technical meaning of the Conditions (1) to (5) will be given.

The Conditions (1) and (2) define the distances L1 and L2. When L1 and L2 do not satisfy at least one of the Conditions (1) and (2), the advantages of the present invention cannot be satisfactorily exhibited, so that this is not desirable.

The Conditions (3), (4), and (5) define the interval between light beams at the deflecting surface of the light deflector, considering the structure of the light-incident optical means extending from the light source means to the light deflector. When at least one of the Conditions (3), (4), and (5) is not satisfied, jitter and pitch error become large, so that this is not desirable.

Next, specific numeric examples will be given.

In the multibeam scanner of the embodiment, the number of light-emitting points of the semiconductor laser array 1 is n=2, the main-scanning-direction pitch is d=0.09 mm, the focal length of the condenser lens system (collimator lens) 2 is fc=16.59 mm, the distance from the reference position of the deflecting surface 5a of the polygon mirror 5 to the first light-shielding member 4a is L1=28.36 mm, the distance from the reference position of the deflecting surface 5a of the polygon mirror 5 to the second light-shielding member 4b is L2=7.09 mm, and the focal length of the scanning lens system 6 in the main scanning direction is fk=108.3 mm. In addition, in the multibeam scanner of the embodiment, L2=0.25×L1. Further, the multibeam scanner of the embodiment satisfies the Condition (1) that indicates the range in which the advantages of the present invention can be satisfactorily exhibited:

$$L2 \leq 0.8 \times L1 \tag{1}$$

The multibeam scanner of the embodiment also satisfies the Condition 2 which indicates the range in which the advantages of the present invention can be satisfactorily exhibited:

$$\left. \begin{array}{l} L2 < L1 \\ L2 \leq 20 \text{ (mm)} \end{array} \right] \tag{2}$$

In the multibeam scanner of the embodiment, $$\frac{d}{2} \times (n-1) \times \frac{L1 + L2}{2 \times fc} \leq 0.05 \text{ (mm)}$$

so that the Condition (3) that indicates the range in which the advantages of the present invention can be satisfactorily exhibited is satisfied:

$$\frac{d}{2} \times (n-1) \times \frac{L1 + L2}{2 \times fc} \leq 0.2 \text{ (mm)} \tag{3}$$

In the multibeam scanner of the embodiment, $$\frac{d}{2} \times (n-1) \times \frac{L1 + L2}{2 \times fc \times fk} \leq 0.0004$$

so that the Condition (4) that indicates the range in which the advantages of the present invention can be satisfactorily exhibited is satisfied:

$$\frac{d}{2} \times (n-1) \times \frac{L1 + L2}{2 \times fc \times fk} \leq 0.01 \tag{4}$$

In addition, the Condition (5) that indicates the range in which the advantages of the present invention can be satisfactorily exhibited is satisfied:

$$\frac{d}{2} \times (n-1) \times \frac{L1 + L2}{2 \times fc \times fk} \leq 0.002 \tag{5}$$

In the embodiment, by satisfying at least one of these Conditions (1) to (5), a multibeam scanner with reduced jitter and pitch error is constructed.

The structural features of the scanning lens system 6 of the multibeam scanner of the embodiment are given in Table 1.

TABLE 1

STRUCTURE OF MULTIBEAM SCANNER

| | | GENERATING-LINE SHAPE OF fθ LENS 6a | | GENERATING-LINE SHAPE OF fθ LENS 6b | | LINE-PERPENDICULAR-TO-GENERATING-LINE SHAPE OF fθ LENS 6a | | LINE-PERPENDICULAR-TO-GENERATING-LINE SHAPE OF fθ LENS 6b | |
|---|---|---|---|---|---|---|---|---|---|
| | | FIRST SURFACE SIDE AWAY FROM LIGHT SOURCE | SECOND SURFACE SIDE AWAY FROM LIGHT SOURCE | FIRST SURFACE LIGHT SOURCE SIDE | SECOND SURFACE LIGHT SOURCE SIDE | FIRST SURFACE SIDE AWAY FROM LIGHT SOURCE | SECOND SURFACE SIDE AWAY FROM LIGHT SOURCE | FIRST SURFACE LIGHT SOURCE SIDE | SECOND SURFACE LIGHT SOURCE SIDE |
| FOCAL LENGTH OF IMAGE-FORMING SCANNING OPTICAL SYSTEM | 108.3 | | | | | | | | |
| WAVELENGTH IN USE (nm) | 780 | R −2.64814E+01 | −1.97526E+01 | R 8.47991E+01 | 8.25696E+01 | Rs −1.16033E+01 | −2.99977E+01 | Rs −7.88803E+01 | −1.00571E+01 |
| REFRACTIVE INDEX OF fθ LENS 6a | 1.5242 | K −1.49902E+00 | −8.11549E−01 | K −8.42997E+00 | −8.26049E−01 | D2 1.66782E−02 | 4.74335E−02 | D2 4.13213E−02 | 1.77203E−03 |
| REFRACTIVE INDEX OF fθ LENS 6b | 1.5242 | B4 2.62745E−05 | 1.30249E−05 | B4 −1.54001E−05 | −2.19243E−05 | D4 −205511B−05 | −7.89235E−04 | D4 −3.82144E−05 | −4.56816E−06 |
| POLYGON DEFLECTING SURFACE 5a TO LIGHT-INCIDENT SURFACE OF LENS 6a | 10.50 | B6 −5.63823E−08 | 3.59039E−08 | B6 1.37412E−08 | 2.45322E−08 | D6 0.00000E+00 | 5.72932E−06 | D6 −1.21474E−08 | 6.29186E−09 |
| | | B8 0.00000E+00 | −9.03558E−11 | B8 −269944E−12 | −2.67301E−11 | D8 0.00000E+00 | −9.37297E−09 | D8 2.14803E−11 | −4.13362E−12 |
| LIGHT-INCIDENT SURFACE OF LENS 6a TO LIGHT-EXITING SURFACE OF LENS 6a | 6.50 | B10 0.00000E+00 | 0.00000E+00 | B10 −2.15513E−15 | 2.10166E−14 | D10 0.00000E+00 | 0.00000E+00 | D10 0.00000E+00 | 1.05481E−15 |
| LIGHT-EXITING SURFACE OF LENS 6a TO LIGHT-INCIDENT SURFACE OF LENS 6b | 7.12 | B12 0.00000E+00 | 0.00000E+00 | B12 7.93243E−19 | −8.35950E−18 | | | | |
| LIGHT-INCIDENT SURFACE OF LENS 6b TO LIGHT-EXITING SURFACE OF LENS 6b | 6.60 | B14 0.00000E+00 | 0.00000E+00 | B14 0.00000E+00 | 1.04822E−21 | | | | |
| LIGHT-EXITING SURFACE OF LENS 6b TO SCAN SURFACE 7 | 103.28 | B16 0.00000E+00 | 0.00000E+00 | B16 0.00000E+00 | 0.00000E+00 | | | | |
| | | SIDE AWAY FROM LIGHT SOURCE | SIDE AWAY FROM LIGHT SOURCE | SIDE AWAY FROM LIGHT SOURCE | SIDE AWAY FROM LIGHT SOURCE | SIDE AWAY FROM LIGHT SOURCE | SIDE AWAY FROM LIGHT SOURCE | SIDE AWAY FROM LIGHT SOURCE | SIDE AWAY FROM LIGHT SOURCE |
| EFFECTIVE SCANNING WIDTH | 214.00 | R −2.64814E+01 | −1.97526E+01 | R 8.47991E+01 | 8.25696E+01 | Rs −1.16033E+01 | −2.99977E+01 | Rs −7.88803E+01 | −1.00571E+01 |
| ANGLE OF VIEW (deg) | 56.24 | K −1.49902E+00 | −8.11549E−01 | K −8.42997E+00 | −8.26049E−01 | D2 −9.72676E−05 | −1.03896E−02 | D2 0.00000E+00 | 1.77203E−03 |

TABLE 1-continued

STRUCTURE OF MULTIBEAM SCANNER

| Description | Value | Generating-Line Shape of fθ Lens 6a | | Generating-Line Shape of fθ Lens 6b | | Line-Perpendicular-to-Generating-Line Shape of fθ Lens 6a | | Line-Perpendicular-to-Generating-Line Shape of fθ Lens 6b | |
|---|---|---|---|---|---|---|---|---|---|
| POLYGON DEFLECTING SURFACE 5a TO SCAN SURFACE 7 | 134.00 | B4 | 2.62745E-05 | B4 | 1.22213E-05 / −1.71719E-05 / −2.31502E-05 | D4 | −7.39144E-06 | D4 | 8.82172E-05 / 0.00000E+00 / −4.56816E-06 |
| POLYGON DEFLECTING SURFACE 5a TO LAST SURFACE OF LENS | 30.72 | B6 | −5.63823E-08 | B6 | 4.20274E-08 / 1.72463E-08 / 2.67547E-08 | D6 | 0.00000E+00 | D6 | −3.60050E-07 / 0.00000E+00 / 6.29186E-09 |
| FIRST LIGHT-SHIELDING MEANS 4a TO POLYGON DEFLECTING SURFACE 5a | 28.36 | B8 | 0.00000E+00 | B8 | −9.98223E-11 / −4.67025E-12 / −2.92126E-11 | D8 | 0.00000E+00 | D8 | 5.30588E-10 / 0.00000E+00 / −4.13362E-12 |
| SECOND LIGHT-SHIELDING MEANS 4b TO POLYGON DEFLECTING SURFACE 5a | 7.00 | B10 | 0.00000E+00 | B10 | 0.00000E+00 / −1.99776E-15 / 2.29436E-14 | D10 | 0.00000E+00 | D10 | 0.00000E+00 / 0.00000E+00 / 1.05481E-15 |
| APERTURE DIAPHRAGM 4 TO POLYGON DEFLECTING SURFACE 5a | 17.68 | B12 | 0.00000E+00 | B12 | 0.00000E+00 / 7.71718E-19 / −8.50899E-18 | | | | |
| FOCAL LENGTH OF COLLIMATOR LENS POLYGON DEFLECTING SURFACE 5a | 16.59 | B14 | 0.00000E+00 | B14 | 0.00000E+00 / 0.00000E+00 / 6.12529E-22 | | | | |
| POLYGON DEFLECTING SURFACE 5a TO FOCUSING POINT | ∞ | B16 | 0.00000E+00 | B16 | 0.00000E+00 / 0.00000E+00 / 0.00000E+00 | | | | |

In the embodiment, the aspherical surface shapes of the first and second fθ lenses 6a and 6b of the scanning lens system 6 within the main scanning cross sectional plane are represented by Condition (6):

$$X = \frac{Y^2/R}{1+\sqrt{1-(1+k)(Y/R)^2}} + B_4Y^4 + B_6Y^6 + B_8Y^8 + B_{10}Y^{10} + B_{12}Y^{12} + B_{14}Y^{14} \quad (6)$$

where the point of intersection of each lens surface and the optical axis is defined as the origin, the direction of the optical axis is defined as the X axis, the axis which is perpendicular to the optical axis within the main scanning cross sectional plane is defined as the Y axis, and the axis which is perpendicular to the optical axis within the sub-scanning cross sectional plane is defined as the Z axis. Here, R is the generating-line curvature radius, and k and $B_4$ to $B_{14}$ each represent an aspherical coefficient.

The shapes within the subscanning cross sectional plane are represented by Condition (7) used to obtain a radius of curvature r' in which a lens surface coordinate in the main scanning direction is Y:

$$r'=r(1+D_2Y^2+D_4Y^4+D_6Y^6+D_8Y^8+D_{10}Y^{10}) \quad (7)$$

Here, r is the radius of curvature of a line perpendicular to the generating line on the optical axis, and $D_2$ to $D_{10}$ are aspherical coefficients.

Here, in the case where the coefficients differ due to a difference in the sign of Y, when Y is positive, the generating-line position X and the radius of curvature r' of a line perpendicular to the generating line are calculated using coefficients to which the letter u is added, $B_{4U}$ to $B_{14U}$ and $D_{2U}$ to $D_{10U}$, respectively. On the other hand, when Y is negative, the generating-line position X and the radius of curvature r' of a line perpendicular to the generating line are calculated using coefficients to which the letter 1 is added, $B_{41}$ to $B_{141}$, and $D_{21}$ to $D_{101}$, respectively.

Figure 4:
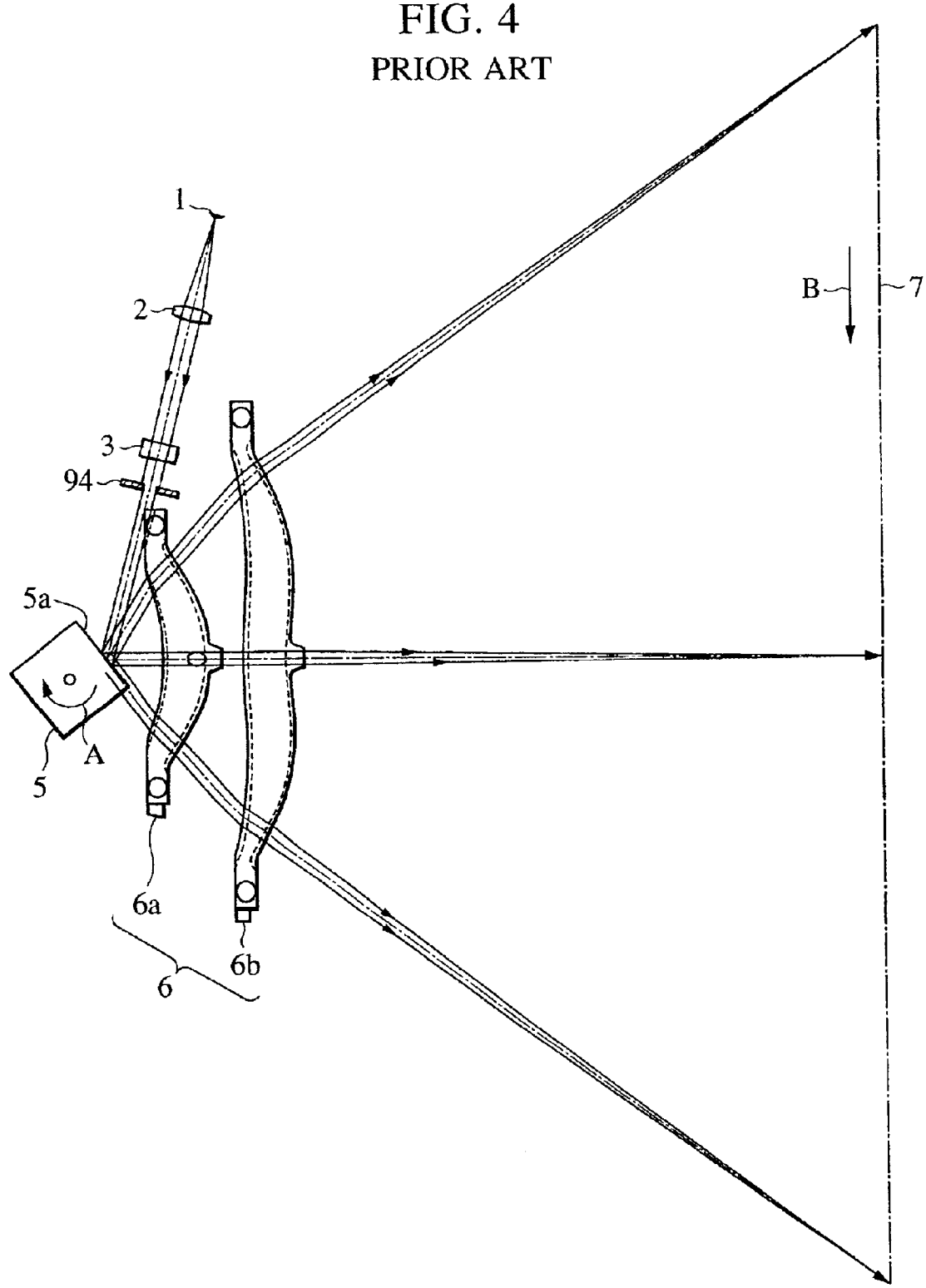
FIG. 4 is a sectional view of a comparative example of the multibeam scanner of the first embodiment of the present invention in the main scanning direction.

FIG. 4 is a sectional view (main scanning sectional view) of the main portion of a comparative example of the embodiment in the main scanning direction.

In the comparative example shown in FIG. 4, a related multibeam scanner using an aperture diaphragm 94 formed by one light-shielding member is shown. The comparative example differs from the embodiment in that the aperture diaphragm 94 is disposed at the position of the first light-shielding member 4a used in the embodiment. The other structural features and optical actions are substantially the same as those of the embodiment.

Figure 5:
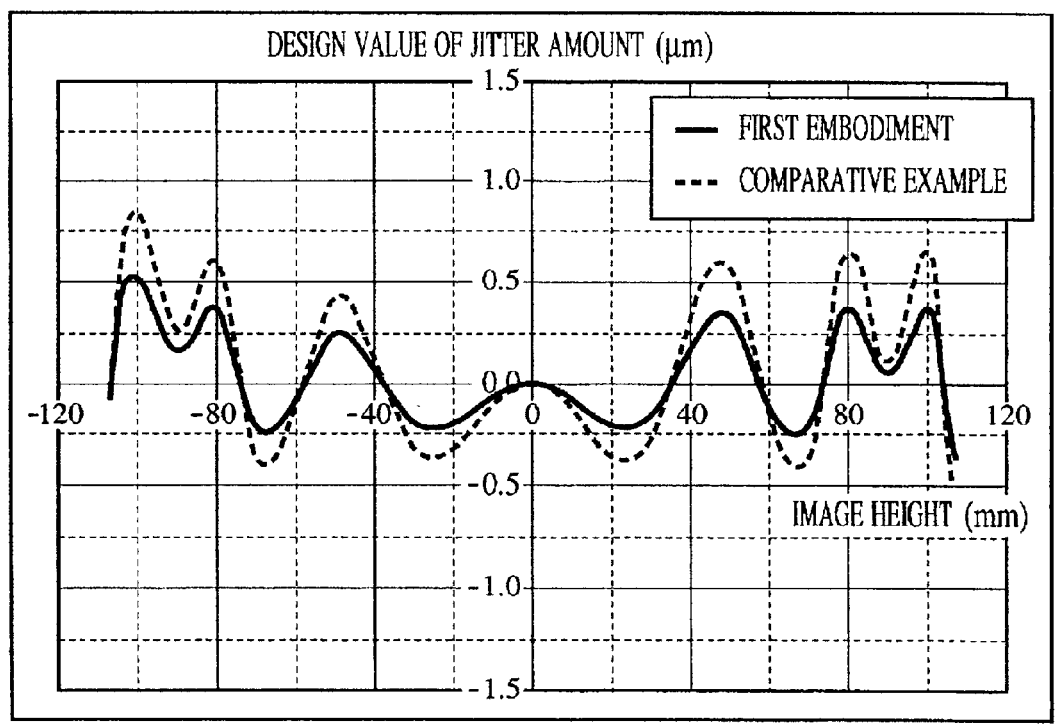
FIG. 5 is a graph showing the design values of the amount of jitter in the comparative example and in the first embodiment of the present invention.

FIG. 5 is a graph showing the design values of jitter amounts in the comparative example and in the first embodiment.

As shown in FIG. 5, in the comparative example, the maximum jitter amount is 0.83 μm and the pitch (P—P) is 1.52 μm, whereas, in the embodiment, the maximum jitter amount is 0.51 μm and the pitch (P—P) is 0.90 μm. It can be understood that the jitter amount is decreased by the aperture diaphragm 4 that has been disposed by separating the aperture diaphragm 4 into the two light-shielding members 4a and 4b in the optical axis direction and bringing one of the light-shielding members 4a and 4b close to the polygon mirror 5.

Figure 6:
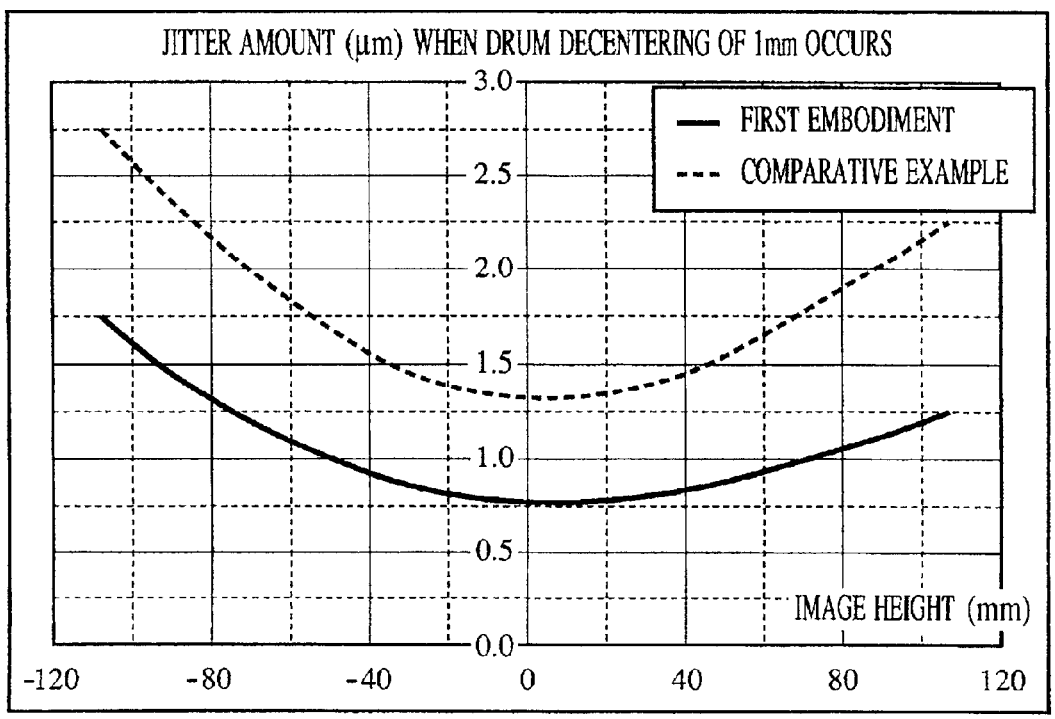
FIG. 6 is a graph showing the amount of jitter that occurs when a drum is decentered in the comparative example and in the first embodiment of the present invention.

FIG. 6 is a graph showing the jitter amount that is produced when the photosensitive drum surface 7 (which is a scan surface) shifts towards the back by 1 mm along the optical axis of the scanning lens system 6.

As shown in FIG. 6, in the comparative example, the maximum jitter amount is 2.76 μm, whereas, in the embodiment, the maximum jitter amount is 1.72 μm. Accordingly, in the embodiment, the jitter amount that is produced by decentering of the photosensitive drum is reduced to approximately two-thirds of the jitter amount in the comparative example.

Figure 7:
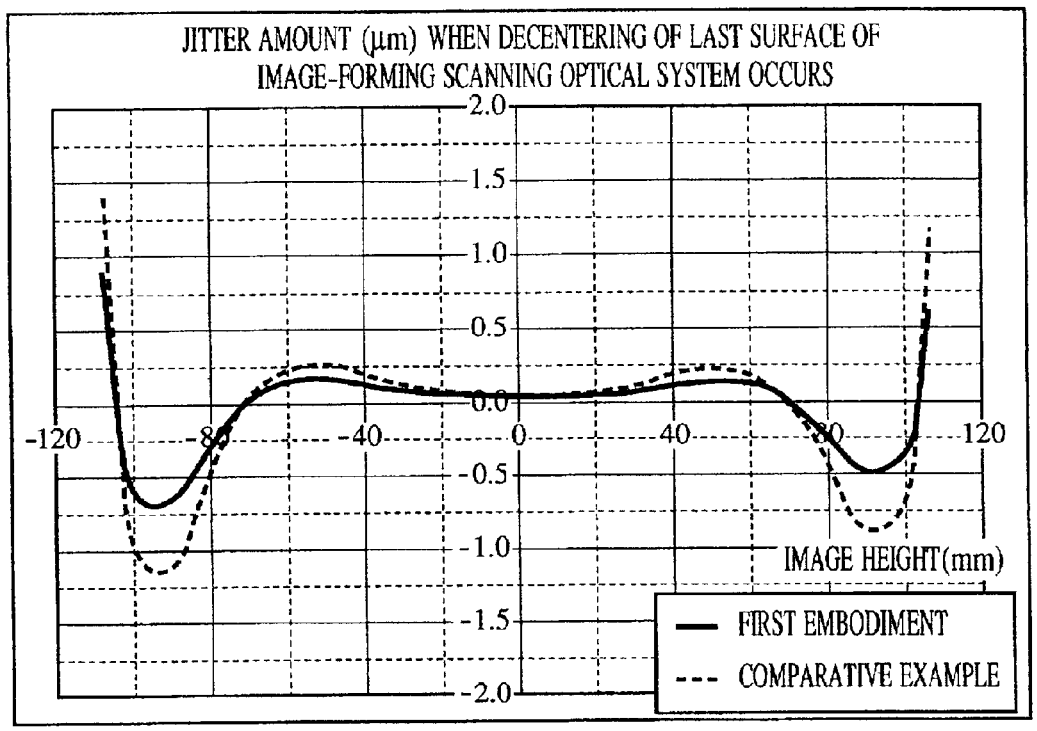
FIG. 7 is a graph showing the amount of jitter that occurs when the last surface of scanning optical means is decentered in the comparative example and in the first embodiment of the present invention.

FIG. 7 is a graph showing the jitter amount that is produced when the last surface of the scanning lens system 6 (the scan-surface-side surface of the lens 6b at the scan-surface side) shifts by 50 μm towards the scan surface along the optical axis of the scanning lens system 6 in the comparative example and in the first embodiment.

As shown in FIG. 7, in the comparative example, the maximum jitter amount is 1.49 μm and the pitch (P—P) is 2.28 μm, whereas, in the embodiment, the maximum jitter amount is 0.93 μm and the pitch (P—P) is 1.62 μm. It is possible to decrease the jitter amount that is produced by the decentering of the photosensitive drum and the decentering of the last surface of the scanning lens system 6 by using the aperture diaphragm 4 used in the embodiment.

Figure 8:
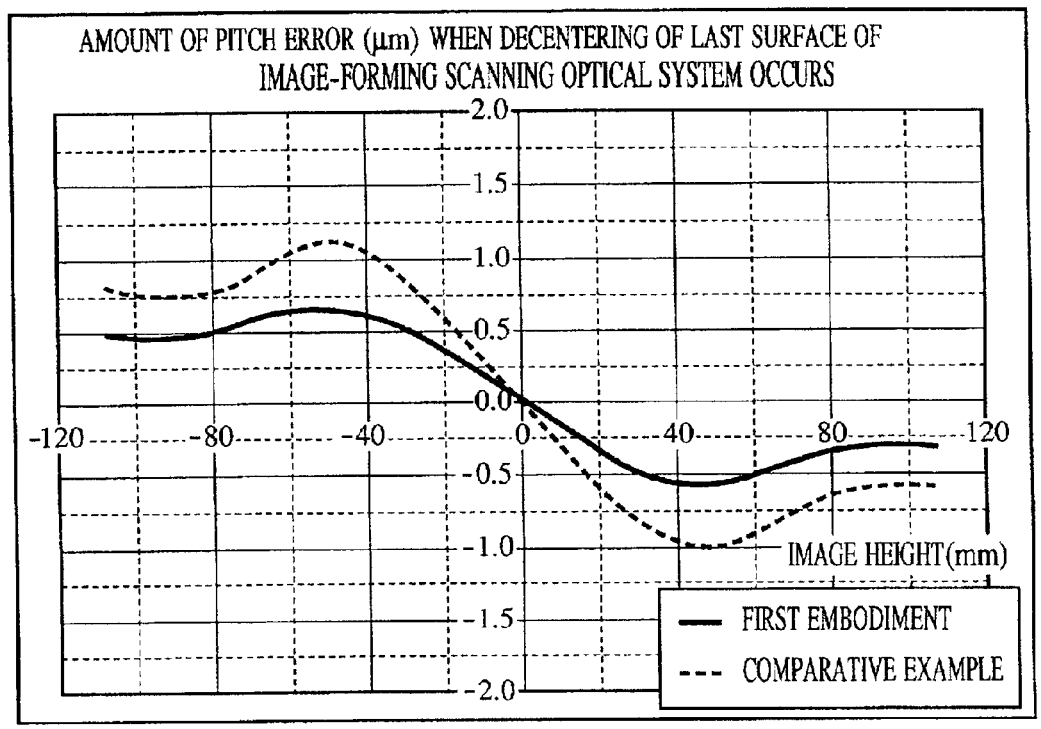
FIG. 8 is a graph showing the amount of pitch error that occurs when the last surface of the scanning optical means is decentered in the comparative example and in the first embodiment of the present invention.

FIG. 8 is a graph showing the amount of pitch error that is produced when the last surface (the scan-surface-side surface of the lens 6b at the scan-surface side) shifts by 50 μm in the subscanning direction in the first embodiment and in the comparative example.

As shown in FIG. 8, in the comparative example, the maximum pitch error amount is 1.11 μm and the pitch (P—P) is 2.09 μm, whereas, in the embodiment, the maximum pitch error amount is 0.67 μm and the pitch (P—P) is 1.22 μm. Using the aperture diaphragm 4 used in the embodiment, it is possible to considerably reduce the amount of pitch error that is produced when the last surface of the scanning lens system 6 is decentered in the subscanning direction.

In the embodiment, the subscanning-direction diameters of the two light beams that have passed through the cylindrical lens 3 are determined by the first light-shielding member 4a as mentioned above. In other words, the light beams that have passed through the cylindrical lens 3 are converged in the subscanning direction, so that, when the subscanning-direction diameters are determined at a location close to the light source means 1 where the subscanning-direction diameters of the light beams are large, it is possible to reduce the effects caused by the aperture diameter.

Accordingly, in the embodiment, the aperture diaphragm 4 is properly constructed and the aforementioned conditions are appropriately set, so that a multibeam scanner with reduced Jitter and pitch error can be provided.

[Second Embodiment]

Figure 9:
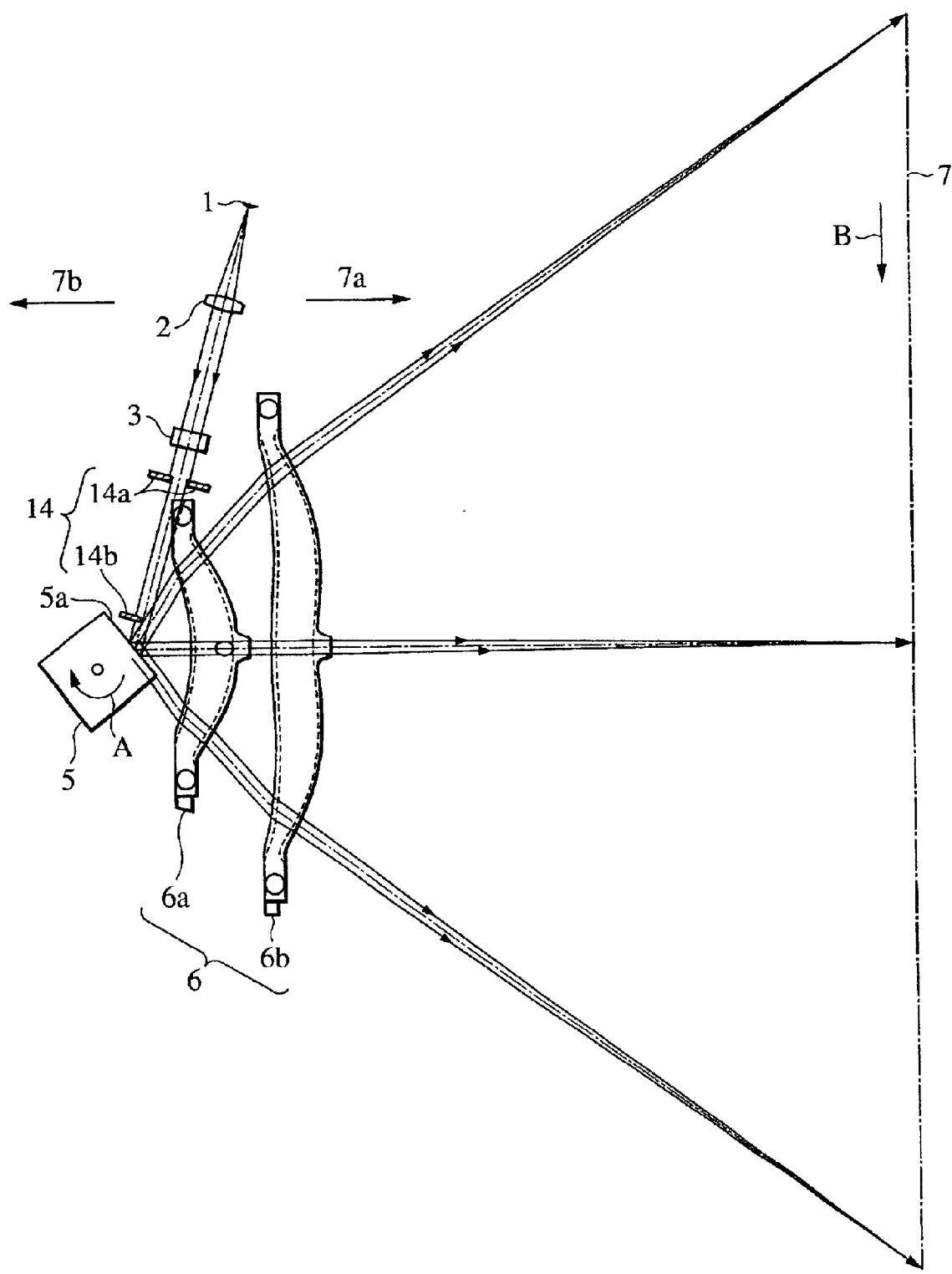
FIG. 9 is a sectional view of a multibeam scanner of a second embodiment of the present invention in the main scanning direction.

FIG. 9 is a sectional view of a multibeam scanner of a second embodiment of the present invention in the main scanning direction. In FIG. 9, component parts corresponding to those shown in FIG. 1 are given the same reference numerals.

The second embodiment differs from the first embodiment in the structure of its aperture diaphragm 14. The other structural features and optical actions are substantially the same as those in the first embodiment, whereby similar advantages are provided.

In FIG. 9, reference numeral 14 denotes the aperture diaphragm including a first light-shielding member 14a and a second light-shielding member 14b. The first light-shielding member 14a determines (restricts) one end of the diameter of at least one of the two light beams that have passed through a cylindrical lens 3 (here, the diameter of A laser beam is restricted). The second light-shielding member 14b restricts the other end of the diameter of the at least one of the two light beams that have passed through the cylindrical lens 3. The first light-shielding member 14a and the second light-shielding member 14b are disposed apart from each other in a direction of propagation of the light beams between the cylindrical lens 3 and a light deflector 5. The diameters of the light beams that are incident upon a deflecting surface 5a of the light deflector 5 are restricted using the two light-shielding members 14a and 14b.

Figure 10:
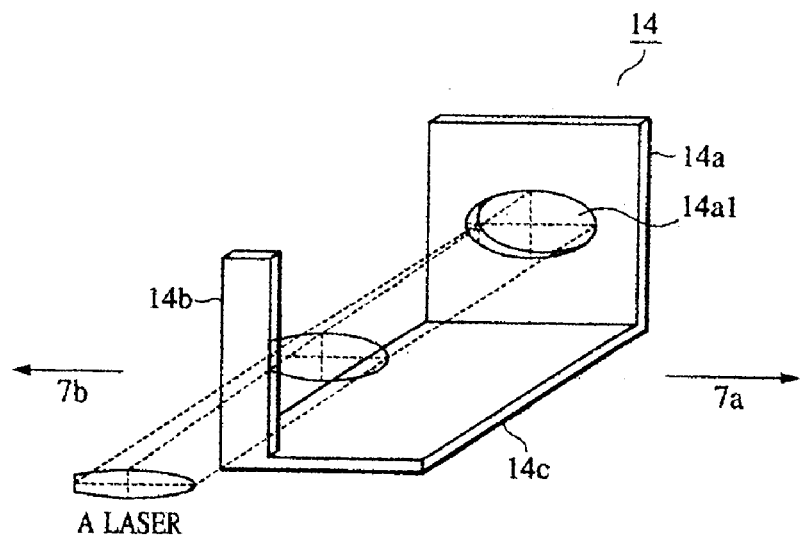
FIG. 10 is a schematic view of the main portion of an aperture diaphragm of the multibeam scanner of the second embodiment of the present invention.

In the second embodiment, as shown in FIG. 10, the first light-shielding member 14a is formed of a flat plate including an elliptical opening 14a1 for restricting the light beams emitted from a semiconductor laser array (not shown) in the main scanning direction and the subscanning direction. The second light-shielding member 14b is formed of a flat plate for intercepting only light beams that are displaced from the optical axis of a condenser lens system (not shown) towards a side 7b opposite to a scan surface. The two light-shielding members 14a and 14b are integrally formed using one sheet plate 14c. The first light-shielding member 14a and the second light-shielding member 14b may be separately provided.

Figure 11:
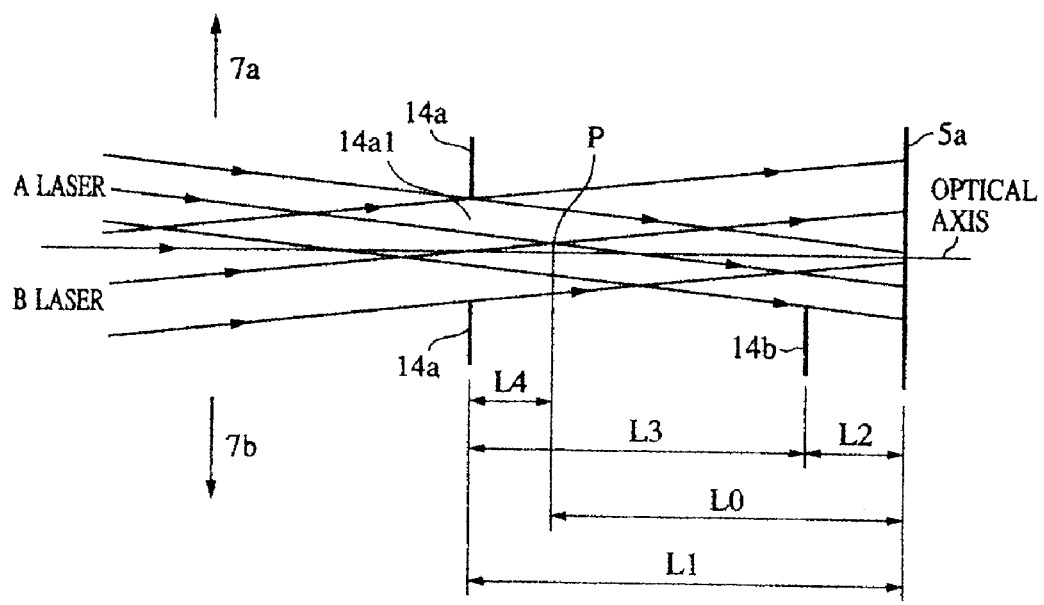
FIG. 11 illustrates optical action at the aperture diaphragm of the multibeam scanner of the second embodiment of the present invention.

Next, the structure and optical action of the aperture diaphragm 14 will be described with reference to FIG. 11. In FIG. 11, the two light beams that have exited from the semiconductor laser array (not shown) are defined as A and B laser beams. FIG. 11 schematically illustrates a state in which, after the A and B laser beams have been converted into substantially parallel light beams by a collimator lens (not shown), the substantially parallel light beams are incident upon the deflecting surface 5a of the polygon mirror 5 through the first and second light-shielding members 14a and 14b. In FIG. 11, component parts corresponding to those shown in FIGS. 9 and 10 are given the same reference numerals.

In FIG. 11, the first light-shielding member 14a restricts a scan-surface-side-7a end of the A laser beam, or a scan-surface-side-7a end of the B laser beam and the subscanning direction diameters. The second light-shielding member 14b restricts only a side-7b portion of the A laser beam opposite to the scan surface.

Here, the A and B laser beams cross each other at a position P disposed towards the second light-shielding member 14b from the first light-shielding member 14a by a distance L4 equal to one-fourth of an interval L3 between the first light-shielding member 14a and the second light-shielding member 14b, so that the aperture diaphragm is practically disposed at this position. When the distance from the deflecting surface 5a to the first light-shielding member 14a is L1 and the distance from the deflecting surface 5a to the second light-shielding member 14b is L2, a distance L0 from the deflecting surface 5a of the polygon mirror 5 to the practical aperture diaphragm is determined by the following Condition (d):

$$L0 = \frac{3 \times L1 + L2}{4} \quad (d)$$

Since L2<L1 (Condition (e)) and L0<L1 (Condition (f)), it can be seen from the numerical conditions that, compared to the position of the aperture diaphragm disposed at a first light-shielding member 14a in a related structure, the practical position of the aperture diaphragm is disposed closer to the deflecting surface 5a.

As in the first embodiment, the amount of jitter and the amount of pitch error vary in proportion to the distance from the deflecting surface 5a of the polygon mirror 5 to the aperture diaphragm 14. Therefore, by making use of the advantages of the present invention, a multibeam scanner with reduced jitter and pitch error can be provided.

Compared to the aperture diaphragm 4 used in the first embodiment, the aperture diaphragm 14 used in the second embodiment has a simpler shape, thereby providing the advantages that costs can be reduced and that differences in the diameters of the plurality of light beams in the main scanning direction can be reduced.

[Third Embodiment]

Figure 12:
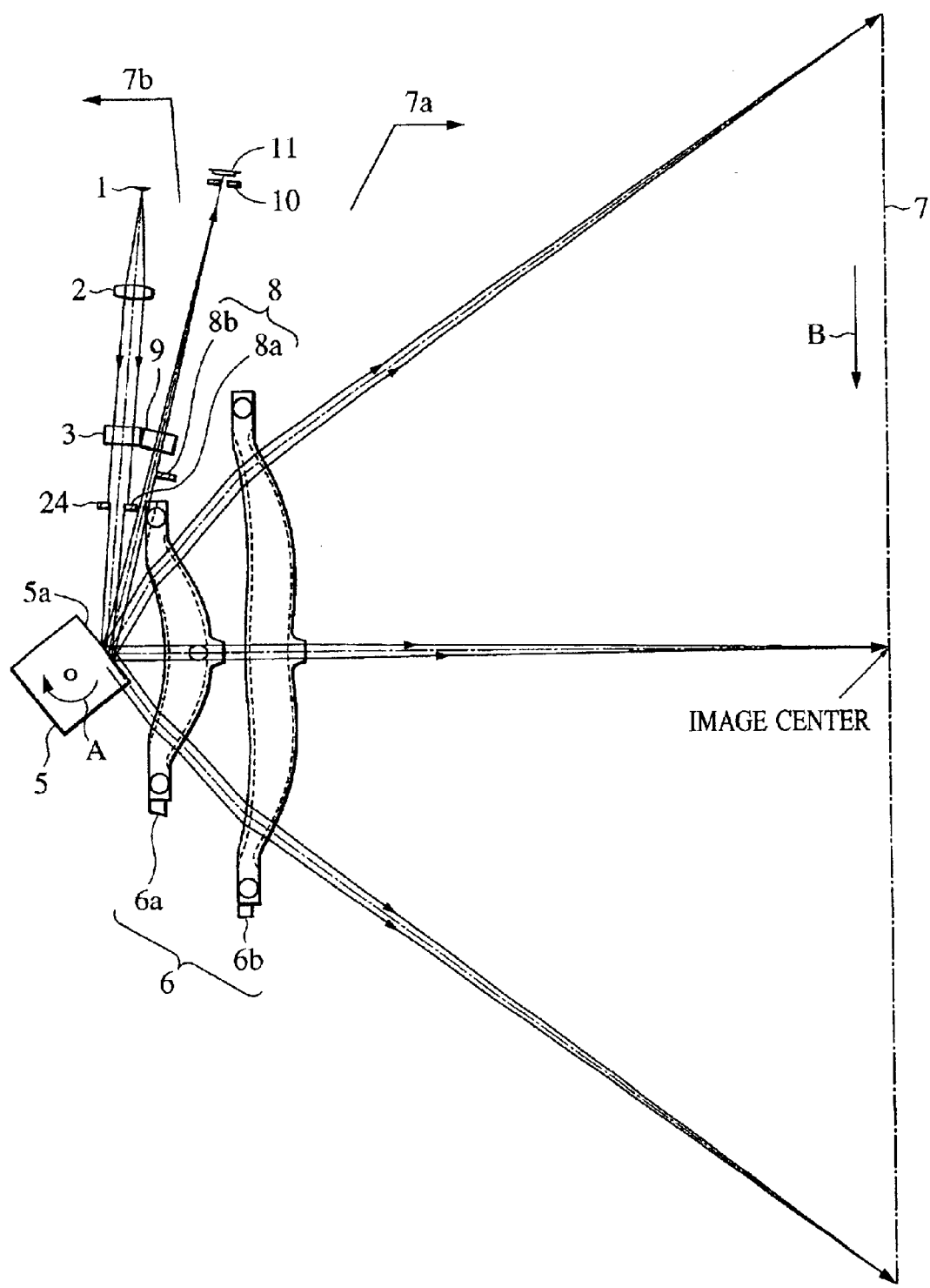
FIG. 12 is a sectional view of a multibeam scanner of a third embodiment of the present invention in the main scanning direction.

FIG. 12 is a sectional view of a multibeam scanner of a third embodiment of the present invention in the main scanning direction. In FIG. 12, component parts corresponding to those shown in FIG. 1 are given the same reference numerals.

The third embodiment differs from the first embodiment in that an aperture diaphragm 24 is formed using one light-shielding member as in the related examples and that synchronism detecting optical means (BD optical system) including a BD diaphragm 8 formed by two light-shielding members, a third light-shielding member 8a and a fourth light-shielding member 8b, is provided. The other structural features and optical actions are substantially the same as those in the first embodiment, whereby similar advantages are provided.

In FIG. 12, reference numeral 24 denotes the aperture diaphragm formed by one light-shielding member as in the related examples. The aperture diaphragm 24 restricts the diameters of two light beams that have exited from light source means 1.

Reference numeral 8 denotes the synchronism detecting diaphragm (hereinafter referred to as the "BD diaphragm") and comprises the third light-shielding member 8a and the fourth light-shielding member 8b. The third light-shielding member 8a intercepts one end of the diameter of at least one of the two light beams (BD light beams) that have been deflected by a polygon mirror 5. The fourth light-shielding member 8b intercepts the other end of the diameter of the at least one light beam. The third and fourth light-shielding members 8a and 8b are disposed apart from each other in the direction in which the light beams propagate between the polygon mirror 5 and a BD sensor 11 (described later).

In the third embodiment, the third light-shielding member 8a is formed of a flat plate integrally formed with the aperture diaphragm 24. As described above, the third light-shielding member 8a restricts one end at a side 7b opposite to a scan surface of the diameter of the at least one of the two light beams (BD light beams) deflected by the polygon mirror 5. The fourth light-shielding member 8b is formed of a flat plate, and restricts the other end of the diameter at a scan-surface side 7a.

Reference numeral 9 denotes a synchronism detecting lens (hereinafter referred to as the "BD lens"), and gathers light in the main scanning direction and the subscanning direction.

Reference numeral 10 denotes a synchronism detecting slit (hereinafter referred to as the "BD slit"), and is disposed at a point where the light beams (BD beams) are focused by the BD lens 9 or near this point in order to determine an image write position.

Reference numeral 11 denotes an optical sensor (hereinafter referred to as the "BD sensor") serving as synchronism detecting means. In the embodiment, using a synchronism signal (BD signal) obtained by detection of an output signal from the BD sensor 11, a timing at a scanning start location for recording an image onto a photosensitive drum surface 7 is adjusted with each BD light beam.

The BD diaphragm 8, the BD lens 9, the BD slit 10, the BD sensor 11, etc., are each component parts of synchronism detecting optical means (BD optical system).

In the embodiment, the two light beams that have exited from a semiconductor laser array 1 after being modulated in accordance with image information are converted into substantially parallel light beams by a collimator lens 2, and the substantially parallel light beams are incident upon a cylindrical lens 3. Of the light beam portions which have impinged upon the cylindrical lens 3, those within the main scanning cross-sectional plane exit therefrom unchanged. On the other hand, those within the subscanning cross-sectional plane are focused to form to form a substantially linear image (that is, a longitudinal linear image in the main scanning direction) at a deflecting surface 5a of a light deflector 5 through the aperture diaphragm 24. At this time, the sizes of the cross sections of the light beams are restricted by the aperture diaphragm 24. The two light beams which have been deflected (reflected) at the deflecting surface 5a of the light deflector 5 are focused in the form of spots on the photosensitive drum surface 7 by a scanning lens system 6. By rotating the light deflector 5 in the direction of arrow A, the photosensitive drum surface 7 is optically scanned at a constant speed in the direction of arrow B (that is, the main scanning direction) in order to perform an image recording operation on the photosensitive drum surface 7, which is a recording medium.

Here, in order to adjust the timing at a scanning start location on the photosensitive drum surface 7 prior to scanning the photosensitive drum surface 7 with light, portions of the two light beams deflected (reflected) at the light detector 5 are focused on the surface of the BD slit 10 by the BD lens 9 through the BD diaphragm 8, after which the focused portions of the two light beams are guided to the BD sensor 11. Using the synchronism signal (BD signal) that has been obtained by the detection of the output signal from the BD sensor 11, the timing at a scanning start location for recording an image on the photosensitive drum surface 7 is adjusted.

In the third embodiment, the semiconductor laser array 1 is rotated with the optical axis of the collimator lens 2 as a center in order to adjust the pitch between scanning lines formed by the two light beams to a specified value. Therefore, the two light beams are separated from each other in the main scanning direction. When the focal length of the BD lens 9 in the main scanning direction is shifted, the problem that the write position is shifted by the BD light beams is created. To overcome this problem, the BD diaphragm 8 is provided between the polygon mirror 5 and the BD lens 9. In a compact multibeam scanner, however, there is sometimes no space for disposing the BD diaphragm 8.

In the third embodiment, the problem that there is no space for disposing the BD diaphragm 8 is overcome by dividing the diaphragm 8 into the first and second light-shielding members 8a and 8b in order to allow the BD diaphragm 8 to be disposed at a large number of locations while retaining the advantages of the BD diaphragm 8.

Although the third embodiment is described by taking the BD diaphragm 8 as an example, the aperture diaphragm 24, disposed between the light source means 1 and tide light detector 5, may be disposed by separately forming two light-shielding members, a first light-shielding member and a second light-shielding member, as in the first embodiment in order to overcome the problem that there is no space for disposing the BD diaphragm 8. In that case, even if a scanner whose light source means emits one light beam, or a multibeam scanner whose light source means emits a plurality of light beams is used, the advantages of the present invention can be satisfactorily exhibited as in the third embodiment.

The BD diaphragm 8 may be such as to limit only the light beam diameters in the main scanning direction.

[Fourth Embodiment]

Figure 13:
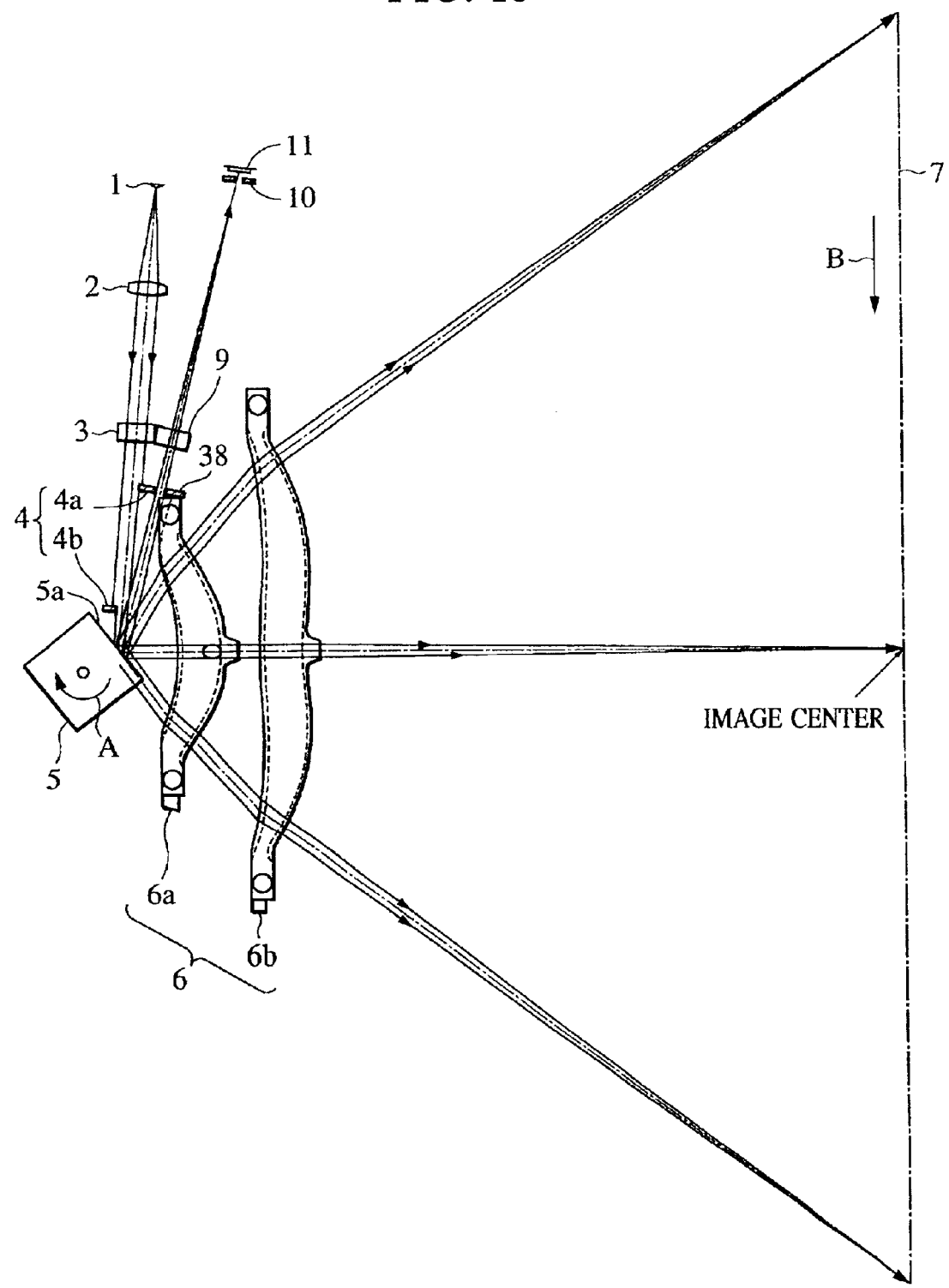
FIG. 13 is a sectional view of a multibeam scanner or a fourth embodiment of the present invention in the main scanning direction.

FIG. 13 is a sectional view of a multibeam scanner of a fourth embodiment of the present invention in the main scanning direction. In FIG. 13, component parts corresponding to those shown in FIGS. 1 and 12 are given the same reference numerals.

The fourth embodiment differs from the first embodiment in that the incident angle of light from light source means 1 that impinges upon a polygon mirror 5 is changed, and in that a synchronism detecting optical system (BD optical system) including a BD diaphragm 38 is provided. The other structural features and optical actions are substantially the same as those in the first embodiment, whereby similar advantages are provided.

The BD optical system includes the BD diaphragm 38 for restricting at least one of the two light beams (BD light beams) deflected by a deflecting surface 5a of a polygon mirror 5, a BD lens 9 for focusing the light beams near a slit 10, and a BD sensor 11 for detecting light. The BD optical system is used to align write positions on a scan surface 7.

In the fourth embodiment, the BD diaphragm 38 is formed of one sheet plate. In addition, first and second light-shielding members 4a and 4b of an aperture diaphragm 4 and the BD diaphragm 38 are integrally formed using one sheet plate as shown in FIG. 14, whereby composite diaphragm means is formed.

The first light-shielding member 4a and the BD diaphragm 38 may be integrally formed to form the composite diaphragm means.

Figure 14:
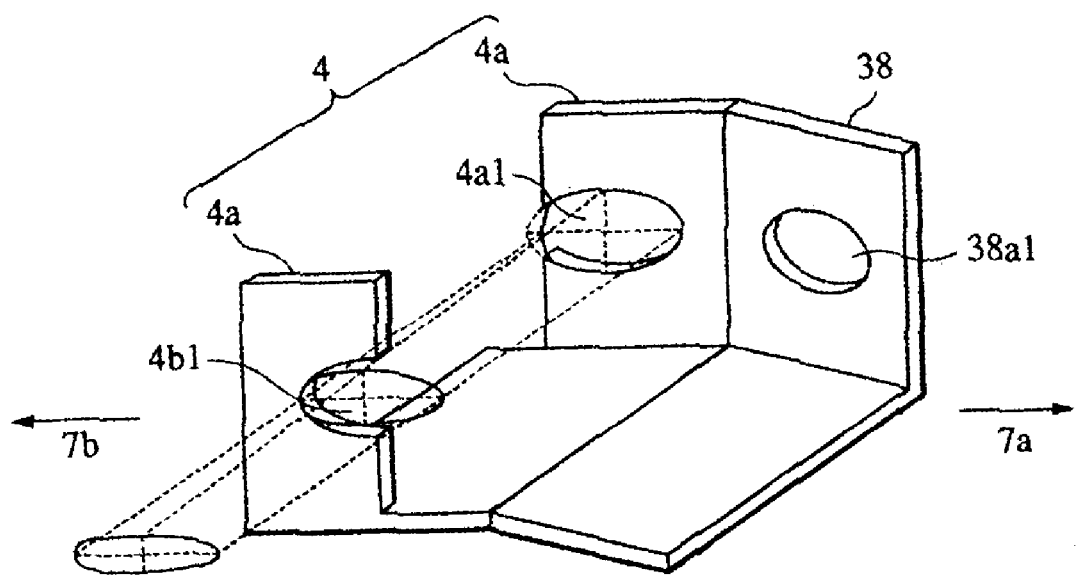
FIG. 14 is a schematic view of the main portion of a diaphragm of the multibeam scanner of the fourth embodiment of the present invention.

As in the first embodiment, in FIG. 14, the first light-shielding member 4a is formed of a flat plate with an elliptical opening 4a1 being formed therein, and has a shape which is formed by cutting away a portion thereof disposed at a side 7b opposite to a scan surface 7 and which restricts scan-surface-side-7a ends of the two light beams that have exited from a semiconductor laser array 1 (not shown). The second light-shielding member 4b is similarly formed of a flat plate with an elliptical opening 4b1 having the same shape as the elliptical opening 4a1 being formed therein, and has a shape which is formed by cutting away a scan-surface-side-7a portion thereof and which restricts ends disposed at the side 7b opposite to the scan surface 7 of the two light beams that have exited from the semiconductor laser array 1. Here, the center of each of the elliptical openings 4a1 and 4b1 is disposed on the optical axis of a collimator lens (not shown).

The BD diaphragm 38 includes an elliptical opening 38a1 that is narrower in the main scanning direction than the elliptical openings 4a1 and 4b1 of the corresponding first and second light-shielding members 4a and 4b. The BD diaphragm 38 restricts the main-scanning-direction diameter of at least one of the two light beams (BD light beams) reflected by the polygon mirror 5 (not shown) in order to make the main-scanning-direction diameters of the two light beams equal to each other.

When a multibeam scanner in which the aperture diaphragm 4 is formed by the first and second light-shielding members 4a and 4b like the scanner of the fourth embodiment shown in FIG. 13 is used, differences in the diameters of the two light beams that have exited from the light source means 1 cause differences in the intensities of the BD light beams incident upon the BD sensor 11, so that an error in detection of synchronism (BD detection) may occur.

In such a case, it is possible to adjust the intensities of the light beams incident upon the BD sensor 11 so that they are the same by changing the amount of light emitted from the light source means 1. As in the fourth embodiment, however, the intensities of the light beams can be adjusted so that they are the same by providing the BD diaphragm 38.

In the structure of the fourth embodiment, by providing the aperture diaphragm 4 formed by the first and second light-shielding means 4a and 4b, the amount of jitter and pitch error are reduced. By providing the BD diaphragm 38, the problem of the differences in the intensities of the two light beams (BD light beams) incident upon the BD sensor 11 is overcome. In other words, when the aperture diaphragm 4, formed by the two light-shielding members 4a and 4b is used, differences between the main-scanning-direction diameters of the two light beams occur, so that differences between light intensities occur. Therefore, in the fourth embodiment, by causing the main-scanning-direction diameters of the light beams incident upon the BD sensor 11 to be the same using the BD diaphragm 38, the light intensities are made constant, so that synchronism is stably detected. By this, it is possible to provide a multibeam scanner which always provides a good image.

By integrally forming the first light-shielding member 4a, the second light-shielding member 4b, and the BD diaphragm 38 using a sheet plate or the like, the number of component parts is decreased, so that reduced costs and the saving of space are achieved.

[Fifth Embodiment]

Figure 15:
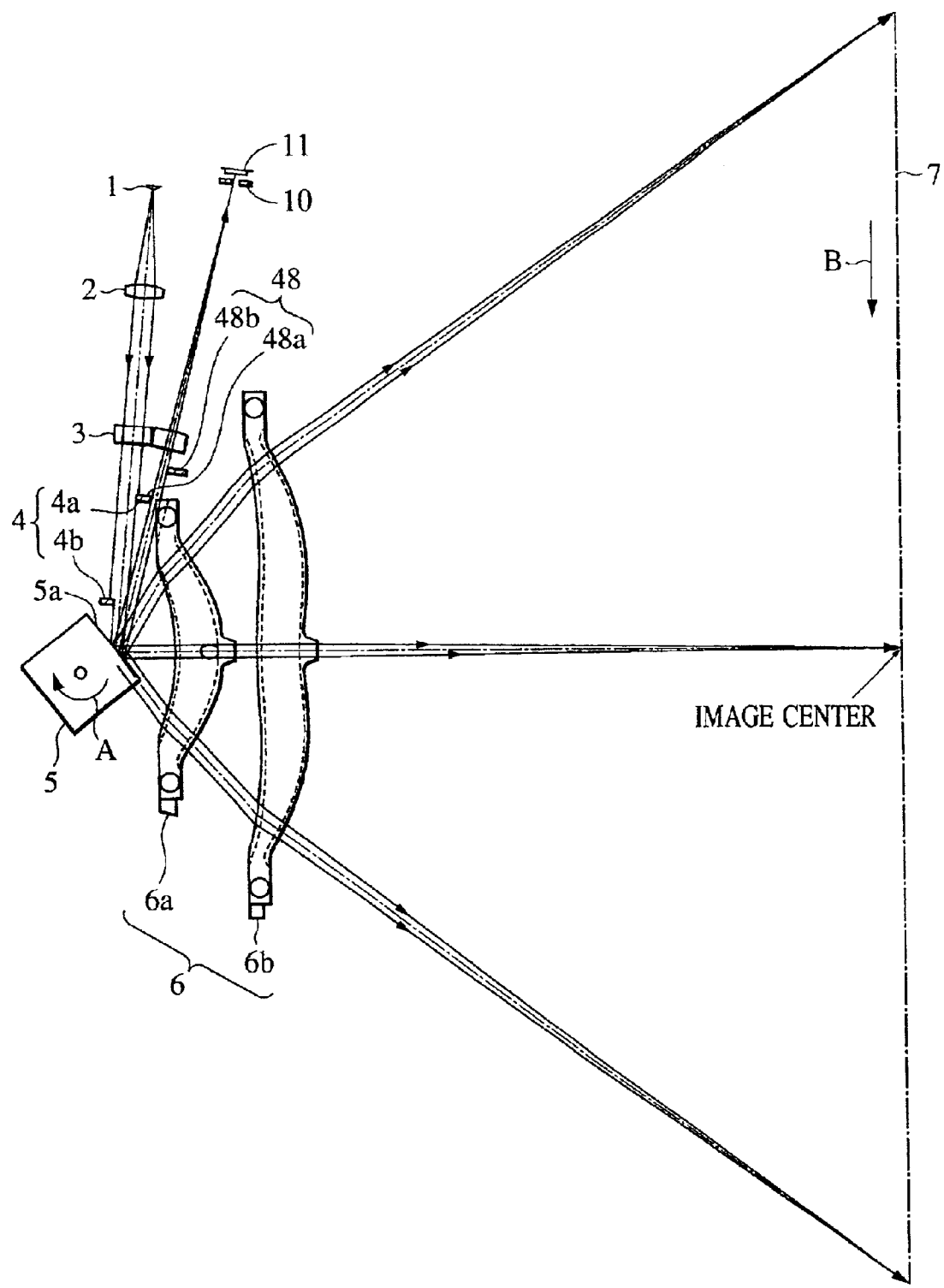
FIG. 15 is a sectional view of a multibeam scanner of a fifth embodiment of the present invention in the main scanning direction.

FIG. 15 is a sectional view of a multibeam scanner of a fifth embodiment of the present invention in the main scanning direction. In FIG. 15, corresponding component parts to those shown in FIG. 1 are given the same reference numerals.

The fifth embodiment differs from the fourth embodiment in that a first light-shielding member 4a of an aperture diaphragm 4 is disposed closer to a polygon mirror 5, a BD diaphragm 48 is formed by third and fourth light-shielding members 48a and 48b, and the third light-shielding member 48a is used as the first light-shielding member 4a. The other structural features and optical actions are substantially the same as those in the fourth embodiment, whereby similar advantages are provided.

In the fifth embodiment, as shown in FIG. 15, with the second light-shielding member 4b being disposed close to a deflecting surface 5a of the polygon mirror 5, the first light-shielding member 4a is disposed close to the deflecting surface 5a. Therefore, the practical aperture diaphragm position is moved closer to the deflecting surface 5a than in the fourth embodiment by the Condition (a).

The BD diaphragm 48 comprises a third light-shielding member 48a and a fourth light-shielding member 48b. The third light-shielding member 48a intercepts one end of the diameter of at least one of the two light beams (BD light beams) that have been deflected by the polygon mirror 5. The fourth light-shielding member 48b intercepts the other end of the diameter of the at least one light beam. The third and fourth light-shielding members 48a and 48b are disposed apart from each other in the direction in which the light beams propagate.

Figure 16:
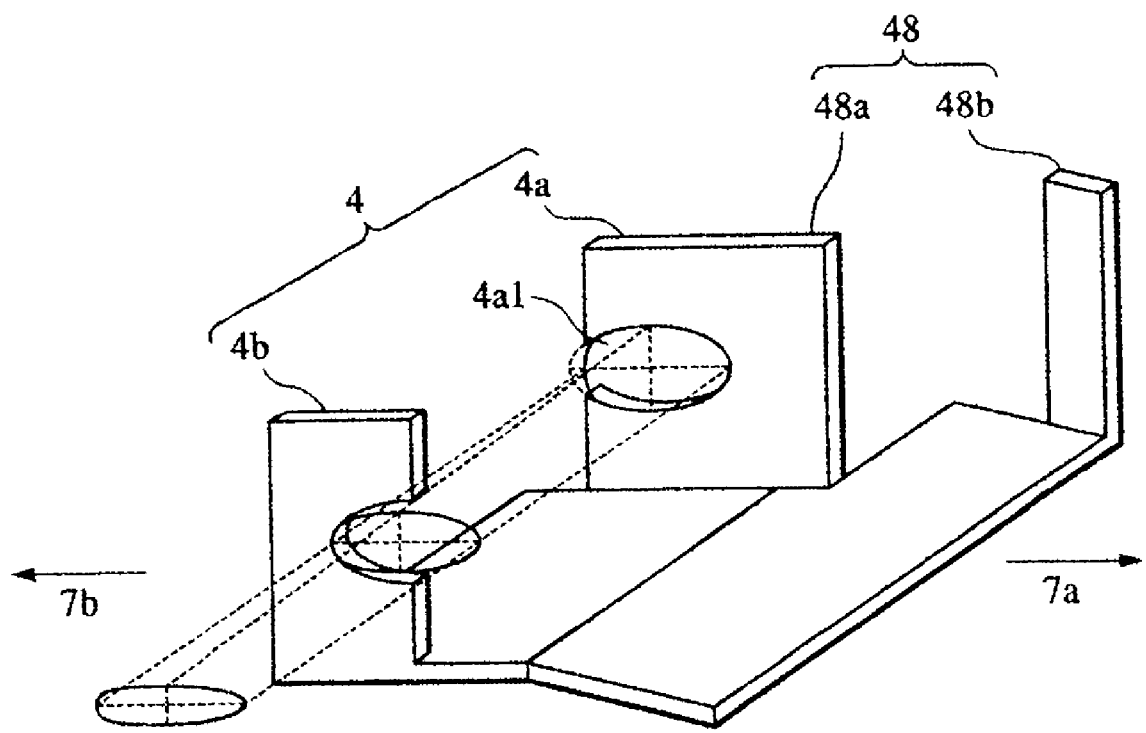
FIG. 16 is a schematic view of the main portion of a diaphragm of the multibeam scanner of the fifth embodiment of the present invention.

FIG. 16 is a schematic view of the main portion of the aperture diaphragm 4 and the synchronism detecting diaphragm 48 of the multibeam scanner of the fifth Embodiment of the present invention.

In FIG. 16, reference numeral 4a denotes the first light-shielding member and reference numeral 4b denotes the second light-shielding member. The aperture diaphragm 4 is formed by the first and second light-shielding members 4a and 4b. Reference numeral 48a denotes the third light-shielding member, and reference numeral 48b denotes the fourth light-shielding member. The BD diaphragm 48 is formed by the third and fourth light-shielding members 48a and 48b. Here, the first light-shielding member 4a and the third light-shielding member 48a are one and the same member, so that space is saved. The BD diaphragm 48 only intercepts light in the main scanning direction, and restricts the main-scanning-direction diameter of at least one of the two light beams (BD light beams) deflected by the polygon mirror (not shown), so that the shapes of the two light beams that have exited from the BD diaphragm 48 are substantially the same and so that their intensities are the same. This A prevents the occurrence of synchronism detecting errors at the BD sensor 11 (not shown).

In the structure of the fifth embodiment, while further reducing litter and pitch error by causing the practical position of the aperture diaphragm 4 formed by the first and second light-shielding members 4a and 4b to be situated close to the polygon mirror 5, space can be saved by using the first light-shielding member 4a of the aperture diaphragm 4 and the third light-shielding member 48a of the BD diaphragm 48 as one and the same member. Therefore, it is possible to realize a compact multibeam scanner with little write position displacements.

Although, in the above-described first to fifth embodiments, the light beams that have been emitted by the light source means are converted into substantially parallel light beams by the collimator lens, the present invention is not limited thereto, so that it is possible to satisfactorily obtain the advantages of the present invention even if the light beams are converted into, for example, convergent light beams or divergent light beams.

Although, in the above-described first to fifth embodiments, a plurality of light beams emitted from the semiconductor laser array including a plurality of light-emitting points are converted into substantially parallel light beams by one collimator lens, the present invention is not limited thereto. Accordingly, it is possible to obtain the advantages of the present invention even by a multibeam scanner which comprises a plurality of light source means each including one light-emitting point and one collimator lens in order to synthesize a plurality of parallel light beams.

Although, in the above-described first to fifth embodiments, a multibeam scanner which emits two light beams is taken as an example, the present invention is not limited thereto. The advantages of the embodiments of the present invention can be similarly obtained even by a single beam scanner which emits one light beam or a multibeam scanner which uses three or more light beams.

Although, in each of the above-described embodiments, the scanning optical means comprises two lenses, the present invention is not limited thereto, so that the scanning optical means may comprise, for example, a single lens or three or more lenses.

[Image Forming Apparatus]

Figure 17:
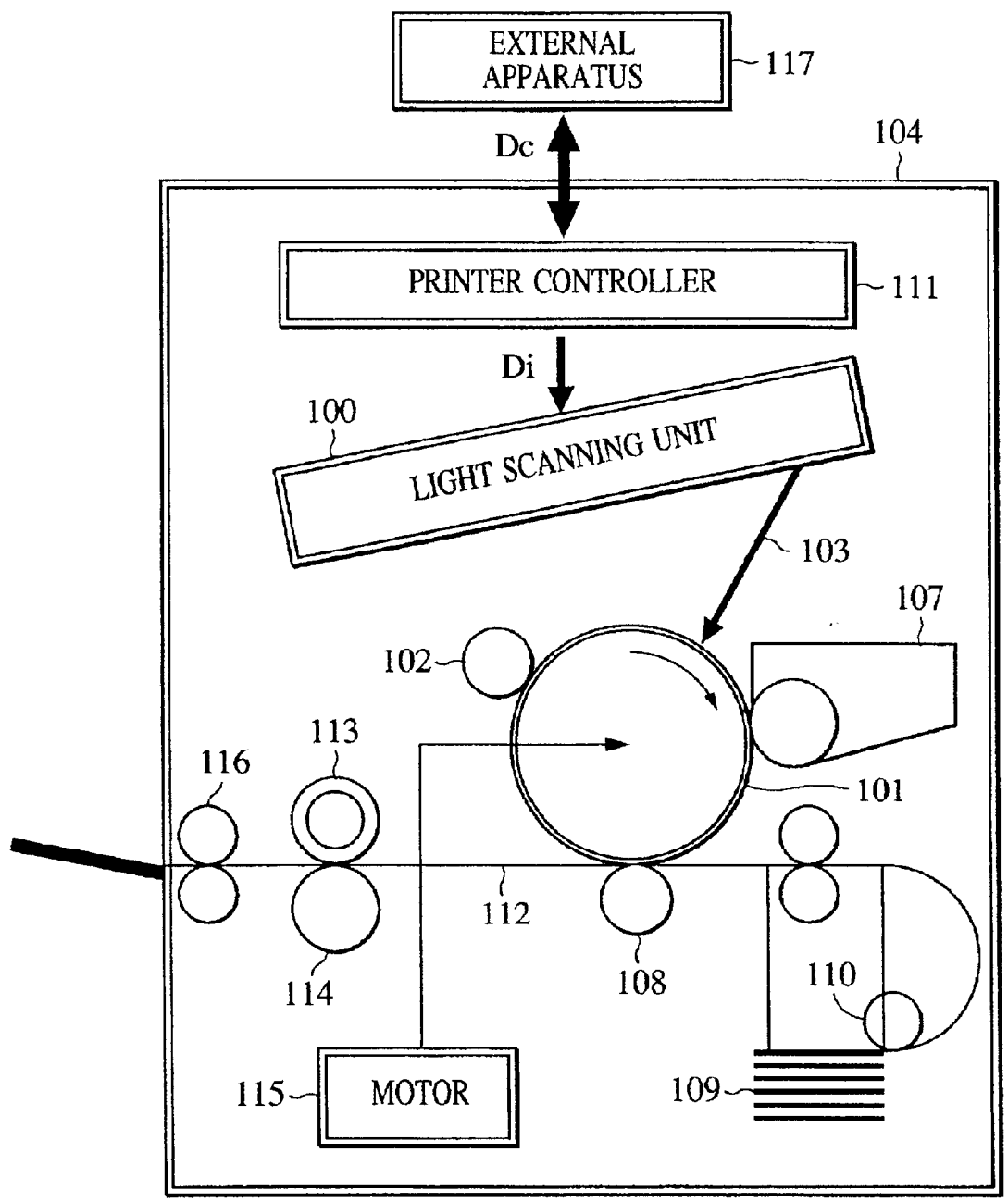
FIG. 17 is a sectional view in a subscanning direction of an example of a structure of an image forming apparatus (electrophotographic printer) using any one of the multibeam scanners of the present invention.
Figure 18:
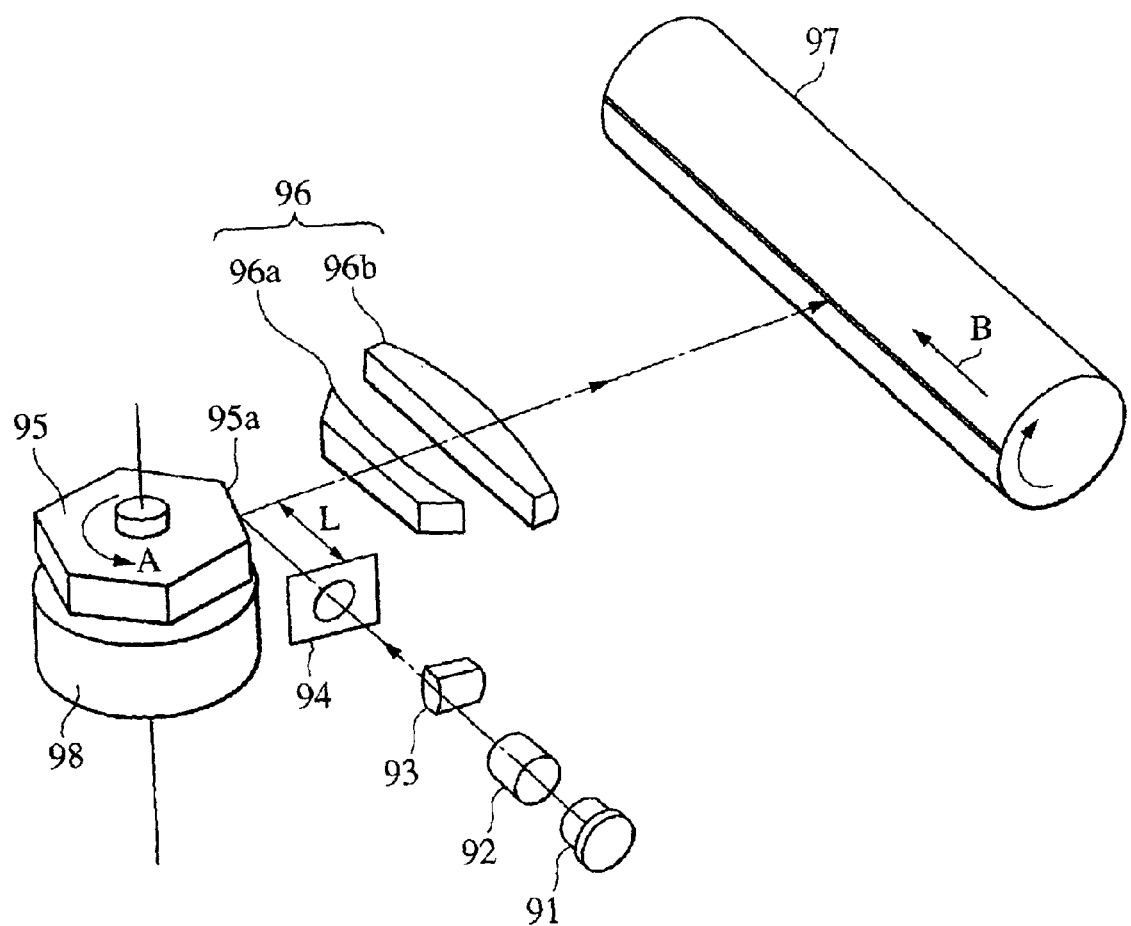
FIG. 18 is a schematic view of the main portion of a related multibeam scanner.
Figure 19:
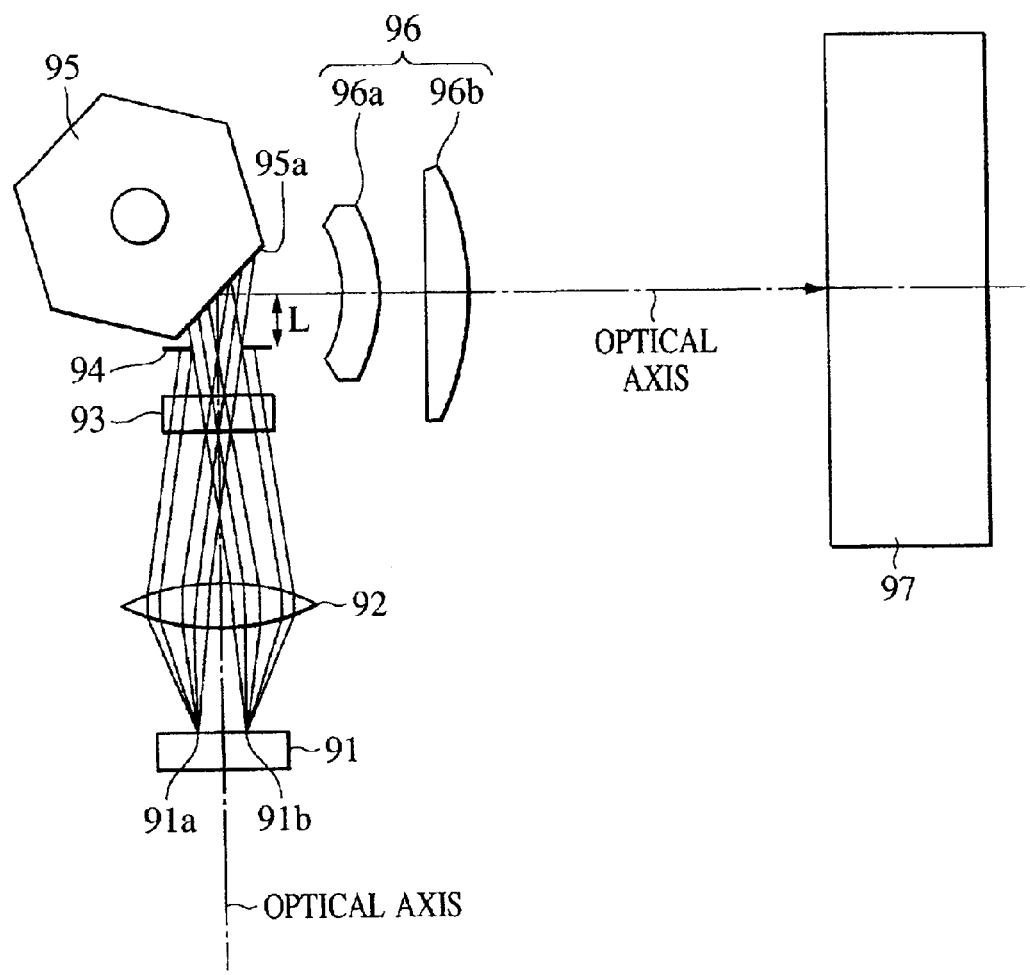
FIG. 19 is a sectional view of another related multibeam scanner in a main scanning direction.

FIG. 17 is a sectional view showing the main portion of an embodiment of an image forming apparatus (electrophotographic printer) in a subscanning cross sectional plane using any one of the multibeam scanners of the first to fifth embodiments. In FIG. 17, reference numeral 104 denotes an image forming apparatus. Code data Dc is input to the image forming apparatus 104 from an external apparatus 117, such as a personal computer. The code data Dc is converted into image data (that is, dot data) Di by a printer controller 111 disposed inside the image forming apparatus 104. The image data Di is input to a light scanning unit (multibeam scanner) 100 having any one of the structures of the first to fifth embodiments. A light beam 103 which has been modulated in accordance with the image data Di exits from the light scanning unit 100. The light beam 103 scans a photosensitive surface of a photosensitive drum 101 in the main scanning direction.

The photosensitive drum 101 which is an electrostatic latent image carrier (a photosensitive member) is rotated clockwise by a motor 115. As the photosensitive drum 101 rotates, the photosensitive surface of the photosensitive drum 101 moves with respect to the light beam 103 in the main scanning direction and the subscanning direction which is perpendicular to the main scanning direction. A charging roller 102 which uniformly charges the surface of the photosensitive drum 101 is provided above the photosensitive drum 101 so that it contacts therewith. The light beam 103 irradiates the surface of the photosensitive drum 101 charged by the charging roller 102 in order to scan it by the light scanning unit 100.

As discussed above, the light beam 103 is modulated based on the image data Di, and, by irradiating the surface of the photosensitive drum 101 with the light beam 103, an electrostatic latent image is formed thereon. The electrostatic latent image is developed as a toner image by a developing device 107 which is disposed so as to contact the photosensitive drum 101 downstream from the location of irradiation by the light beam 103 within the rotation cross sectional plane of the photosensitive drum 101.

The toner image which has been formed by developing the electrostatic latent image by the developing device 107 is transferred onto a sheet 112 used as a transfer material by a transfer roller (transfer device) 108 disposed below the photosensitive drum 101 so as to oppose it. Although the sheet 112 is contained in a sheet cassette disposed in front of the photosensitive drum 101 (that is, at the right side of the photosensitive drum 101 in FIG. 17), it may be fed manually. A sheet feed roller 110 is disposed at an end of the sheet cassette 109, and is used to send the sheet 112 which is contained in the sheet cassette 109 into a transportation path.

In this way, the sheet 112 having the toner image transferred but not fixed thereon is transported to a fixing age device which is disposed behind the photosensitive drum 101 (that is, at the left side of the photosensitive drum 101 in FIG. 17). The fixing device comprises a fixing roller 113 and a presser roller 114. The fixing roller 113 has a fixing heater (not shown) disposed therein. The presser roller 114 is disposed so as to press-contact the fixing roller 113. The sheet 112 which has been transported from the transfer section is heated by pressing it at a press-contacting section formed by the fixing roller 113 and the presser roller 114 in order to fix the toner image. A sheet-discharge roller 116 is disposed behind the fixing roller 113 in order to discharge the sheet 112 with the toner image fixed thereon out of the image forming apparatus 104.

Although not illustrated in FIG. 17, the printer controller 111 not only converts the code data Dc but also controls each part, such as the motor 115, disposed inside the image-forming apparatus 104, and a polygon motor and the like disposed inside the light scanning unit 100.

[Diaphragm Member]

The aperture diaphragm including two light-shielding members used in the first, second, fourth, and fifth embodiments may be used in various optical systems, such as shooting systems, illumination systems, or projection systems.

According to the present invention, by disposing a portion of the divided aperture diaphragm near the deflecting means as described above, it is possible to realize a light scanner and a multibeam scanner which can reduce jitter and pitch error. It is also possible to realize an image forming apparatus using the same.

In addition, it is possible to achieve a light scanner and a multibeam scanner which allow the aperture diaphragm and the synchronism detecting diaphragm to be disposed at a larger number of locations. It is also possible to achieve an image forming apparatus using the same.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A light scanner comprising:
   a deflector for deflecting light emitted from a light source;
   a scanning optical system for guiding the light deflected by said deflector to a scan surface;
   a first light-shielding member for determining one end of a diameter within a main scanning cross section plane of the light emitted from the light source; and
   a second light-shielding member for determining the other end of the diameter within the main scanning cross section plane of the light emitted from the light source,
   wherein said first light-shielding member and said second light-shielding member are used to limit the diameter of the light emitted from the light source and are disposed apart from each other in a direction in which the light propagates.

2. A light scanner according to claim 1, wherein said first light-shielding member and said second light-shielding member are integrally formed.

3. A light scanner according to claim 1, wherein said first light-shielding member and said second light-shielding member limit a diameter of the light within a main scanning cross sectional plane.

4. A light scanner according to claim 1, wherein said first light-shielding member and said second light-shielding member limit a diameter of the light within a subscanning cross sectional plane.

5. An image forming apparatus comprising:
   a light scanner according to any one of claims 1 to 4; a photosensitive member disposed at the scan surface; a developing device for developing as a toner image an electrostatic latent image formed on said photosensitive member using the light with which said photosensitive member has been scanned by said light scanner;
   a transferring device for transferring the toner image formed by said developing device onto a transfer material; and
   a fixing device for fixing the transferred toner image to the transfer material.

6. An image forming apparatus comprising:
   a light scanner according to any one of claims 1 to 4; and
   a printer controller for converting code data input from an external device into an image signal, and inputting the image signal to said light scanner.

7. A multi-beam scanner comprising:
   a light source for emitting a plurality of light beams;
   a deflector for deflecting the plurality of light beams emitted from said light source; and
   a scanning optical system for guiding the plurality of light beams that have been deflected by said deflector onto a scan surface;
   a first light-shielding member for determining one end of a diameter within a main scanning cross section plane of at least one of the plurality of light beams; and
   a second light-shielding member for determining the other end of the diameter within the main scanning cross section plane of the at least one of the plurality of light beams,
   wherein said first light-shielding member and said second light-shielding member are used to limit the diameter of the at least one of the plurality of light beams and are disposed apart from each other in a direction in which the light beams propagate.

8. A multi-beam scanner according to any one of claims 7, 10 and 14 to 17, wherein said first light-shielding member and said second light-shielding member limit the light-beam diameter within a main scanning cross sectional plane.

9. A multi-beam scanner according to any one of claims 7, 10 and 14 to 17, wherein said first light-shielding member and said second light-shielding member limit the light-beam diameter within a subscanning cross sectional plane.

10. A multi-beam scanner comprising:
    a light source for emitting a plurality of light beams;
    a deflector for deflecting the plurality of light beams emitted from said light source;
    a scanning optical system for guiding the plurality of light beams that have been deflected by said deflector onto a scan surface;
    a first light-shielding member for determining one end of a diameter of at least one of the plurality of light beams; and a second light-shielding member for determining the other end of the diameter of the at least one of the plurality of light beams, wherein said first light-shielding member and said second light-shielding member are used to limit the diameter of the at least one of the plurality of light beams and are disposed apart from each other in a direction in which the light beams propagate, wherein said first light-shielding member determines a scan-surface-side portion of the diameter of the at least one of the plurality of light beams and said second light-shielding member determines a portion at a side opposite to the scan-surface side of the diameter of the at least one of the plurality of light beams, and wherein said second light-shielding member is disposed closer to said deflector than said first light-shielding member.

11. A multi-beam scanner according to any one of claims 7, 10 and 14 to 17, further comprising:

a cylindrical lens disposed between said light source and said deflector having a refractive power only in a subscanning direction, wherein said first light-shielding member and said second light-shielding member are disposed between said cylindrical lens and said deflector.

12. A multi-beam scanner according to any one of claims 7, 10 and 14 to 17, wherein of said first and second light-shielding members, the light-shielding member that is disposed at a light-source side determines subscanning-direction diameters of the plurality of light beams emitted from said light source.

13. A multi-beam scanner according to any one of claims 7, 10 and 14 to 17, wherein said first light-shielding member and said second light-shielding member are integrally formed.

14. A multi-beam scanner comprising:

a light source for emitting a plurality of light beams;

a deflector for deflecting the plurality of light beams emitted from said light source;

a scanning optical system for guiding the plurality of light beams that have been deflected by said deflector onto a scan surface;

a first light-shielding member for determining one end of a diameter of at least one of the plurality of light beams; and a second light-shielding member for determining the other end of the diameter of the at least one of the plurality of light beams, wherein said first light-shielding member and said second light-shielding member are used to limit the diameter of the at least one of the plurality of light beams and are disposed apart from each other in a direction in which the light beams propagate, wherein said first light-shielding member and said second light-shielding member are disposed in that order from a light-source side, and wherein when the distance from a reference position of a deflecting surface of said deflector to said first light-shielding member is L1 (mm), and when the distance from the reference position of the deflecting surface of said deflector to said second light-shielding member is L2 (mm), the following condition is satisfied:

$$L2 \leq 0.8 \times L1.$$

15. A multi-beam scanner comprising:

a light source for emitting a plurality of light beams;

a deflector for deflecting the plurality of light beams emitted from said light source;

a scanning optical system for guiding the plurality of light beams that have been deflected by said deflector onto a scan surface;

a first light-shielding member for determining one end of a diameter of at least one of the plurality of light beams; and a second light-shielding member for determining the other end of the diameter of the at least one of the plurality of light beams, wherein said first light-shielding member and said second light-shielding member are used to limit the diameter of the at least one of the plurality of light beams and are disposed apart from each other in a direction in which the light beams propagate, wherein said first light-shielding member and said second light-shielding member are disposed in that order from a light-source side, and wherein when the distance from a reference position of a deflecting surface of said deflector to said first light-shielding member is L1 (mm), and when the distance from the reference position of the deflecting surface of said deflector to said second light-shielding member is L2 (mm), the following conditions are satisfied:

$$L2 < L1$$

$$L2 \leq 20 \text{ (mm)}.$$

16. A multi-beam scanner comprising:

a light source for emitting a plurality of light beams;

a deflector for deflecting the plurality of light beams emitted from said light source;

a scanning optical system for guiding the plurality of light beams that have been deflected by said deflector onto a scan surface;

a first light-shielding member for determining one end of a diameter of at least one of the plurality of light beams;

a second light-shielding member for determining the other end of the diameter of the at least one of the plurality of light beams; and a lens system disposed between said light source and said deflector, wherein said first light-shielding member and said second light-shielding member are disposed between said light source and said lens system, wherein said first light-shielding member and said second light-shielding member are used to limit the diameter of the at least one of the plurality of light beams and are disposed apart from each other in a direction in which the light beams propagate, wherein said first light-shielding member and said second light-shielding member are disposed in that order from a light-source side, wherein said light source includes a plurality of light-emitting points, and wherein when the number of the plurality of light-emitting points is n, the pitch in a main scanning direction is d (mm), the focal length of said lens system is fc (mm), the distance from a reference position of a deflecting surface of said deflector to said first light-shielding member is L1 (mm), and the distance from the reference position of the deflecting surface of said deflector to said second light-shielding member is L2 (mm), the following condition is satisfied:

$$\frac{d}{2} \times (n-1) \times \frac{L1 + L2}{2 \times fc} \leq 0.2 \text{ (mm)}.$$

17. A multi-beam scanner comprising:
a light source for emitting a plurality of light beams;
a deflector for deflecting the plurality of light beams emitted from said light source;
a scanning optical system for guiding the plurality of light beams that have been deflected by said deflector onto a scan surface;
a first light-shielding member for determining one end of a diameter of at least one of the plurality of light beams;
a second light-shielding member for determining the other end of the diameter of the at least one of the plurality of light beams; and
a lens system disposed between said light source and said deflector,
wherein said first light-shielding member and said second light-shielding member are disposed between said light source and said lens system, wherein said first light shielding member and said second light-shielding member are disposed in that order from a light-source side,
wherein said first light-shielding member and said second light-shielding member are used to limit the diameter of the at least one of the plurality of light beams and are disposed wart from each other in a direction in which the light beams propagate,
wherein said light source includes a plurality of light-emitting points, and wherein when the number of the plurality of light-emitting points is n, the pitch in a main scanning direction is d (mm), the focal length of said lens system is fc (mm), the distance from a reference position of a deflecting surface of said deflector to said first light-shielding member is L1 (mm), the distance from the reference position of the deflecting surface of said deflector to said second light-shielding member is L2 (mm), and the focal length of said scanning optical system within a main scanning cross sectional plane is fk (mm), the following condition is satisfied:

$$\frac{d}{2} \times (n-1) \times \frac{L1 + L2}{2 \times fc \times fk} \leq 0.01.$$

18. A multi-beam scanner according to claim 17, wherein the following condition is satisfied:

$$\frac{d}{2} \times (n-1) \times \frac{L1 + L2}{2 \times fc \times fk} \leq 0.002.$$

19. An image forming apparatus comprising:
a multi-beam scanner according to any one of claims 7, 10 and 14 to 17;
a photosensitive member disposed at the scan surface;
a developing device for developing as a toner image an electrostatic latent image formed on said photosensitive member using the light beams with which said photosensitive member has been scanned by said multi-beam scanner;
a transferring device for transferring the toner image formed by said developing device onto a transfer material; and
a fixing device for fixing the transferred toner image to the transfer material.

20. An image forming apparatus comprising:
a multi-beam scanner according to any one of claims 7, 10 and 14 to 17; and
a printer controller for converting code data input from an external device into an image signal and inputting the image signal to said multibeam scanner.

21. A multi-beam scanner according to any one of claims 7, 10 and 14 to 17, wherein said light source comprises a plurality of light-emitting points spaced apart from each other at least in a main scanning direction.

* * * * *